United States Patent
Sokol et al.

(10) Patent No.: US 12,396,411 B2
(45) Date of Patent: Aug. 26, 2025

(54) SYSTEMS AND METHODS FOR DESIGNING AND MODELING PRESSURE-COMPENSATING DRIP EMITTERS, AND IMPROVED DEVICES IN VIEW OF THE SAME

(71) Applicant: MASSACHUSETTS INSTITUTE OF TECHNOLOGY, Cambridge, MA (US)

(72) Inventors: Julia Sokol, Cambridge, MA (US); Jaya Narain, Santa Clara, CA (US); Amos Greene Winter, V, Somerville, MA (US); Jeffrey Costello, Brighton, MA (US); Dheekshita Kumar, East Walpole, MA (US); Tristan J. McLaurin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 793 days.

(21) Appl. No.: 17/402,209

(22) Filed: Aug. 13, 2021

(65) Prior Publication Data
US 2022/0046869 A1    Feb. 17, 2022

Related U.S. Application Data

(60) Provisional application No. 63/065,491, filed on Aug. 13, 2020.

(51) Int. Cl.
*A01G 25/02* (2006.01)
*A01G 25/00* (2006.01)

(52) U.S. Cl.
CPC .......... *A01G 25/023* (2013.01); *A01G 25/006* (2025.01)

(58) Field of Classification Search
CPC . A01G 25/02; A01G 25/023; A01G 2025/006
See application file for complete search history.

(56) References Cited

U.S. PATENT DOCUMENTS

| | | | |
|---|---|---|---|
| 2,460,647 | A | 2/1949 | Miller |
| 4,307,841 | A | 12/1981 | Mehoudar et al. |
| (Continued) | | | |

FOREIGN PATENT DOCUMENTS

| | | |
|---|---|---|
| AU | 633097 B2 | 1/1993 |
| CN | 106777589 A | 5/2017 |
| (Continued) | | |

OTHER PUBLICATIONS

Zhang, J., et al., "New Method of Hydraulic Performance Evaluation on Emitters with Labyrinth Channels," J. Irrig. Drain. Eng., 137(12), pp. 811-815, 2011.
(Continued)

*Primary Examiner* — Joseph A Greenlund
(74) *Attorney, Agent, or Firm* — Barnes & Thornburg LLP

(57) ABSTRACT

Systems and methods for modeling ways to best design pressure-controlled drip irrigation emitters are provided. The systems and methods are designed to help reduce activation pressure while maintaining a substantially constant, desirable flow rate in an irrigation system. Various parameters that impact the activation pressure and the flow rate can be adjusted to assist in finding optimal designs. The parameters can at least include one or more of resistances in a flow path, resistances in a membrane cavity, a membrane, or placement of a membrane with respect to a membrane cavity. Optimal designs for such emitters based on the discloses systems and methods are provided, including at least one exemplary embodiment in which a length of a flow path is substantially reduced as compared to known emitters.

18 Claims, 17 Drawing Sheets

(56) References Cited

U.S. PATENT DOCUMENTS

| | | | |
|---|---|---|---|
| 4,424,936 A * | 1/1984 | Marc | A01G 25/023 138/45 |
| 4,573,640 A | 3/1986 | Mehoudar | |
| 4,589,595 A | 5/1986 | Havens | |
| 5,413,282 A | 5/1995 | Boswell | |
| 5,465,905 A * | 11/1995 | Elder | B05B 1/1609 239/533.1 |
| 5,609,303 A | 3/1997 | Cohen | |
| 5,711,482 A | 1/1998 | Yu | |
| 5,794,849 A | 8/1998 | Elder | |
| 5,813,603 A | 9/1998 | Kurtz | |
| 8,511,585 B2 | 8/2013 | Keren | |
| 8,511,586 B2 | 8/2013 | Einav et al. | |
| 8,870,098 B2 | 10/2014 | Lutzki et al. | |
| 9,439,366 B2 | 9/2016 | Kidachi | |
| 9,872,444 B2 | 1/2018 | Turk | |
| 10,034,439 B2 * | 7/2018 | Kidachi | B05B 1/202 |
| 10,426,104 B2 | 10/2019 | Shamshery et al. | |
| 10,517,236 B2 * | 12/2019 | Keren | A01G 25/023 |
| 10,626,998 B2 * | 4/2020 | Rulli | F16K 7/07 |
| 2003/0150940 A1 * | 8/2003 | Vildibill | A01G 25/023 239/542 |
| 2005/0284966 A1 | 12/2005 | DeFrank | |
| 2007/0108318 A1 | 5/2007 | Mamo et al. | |
| 2010/0155508 A1 | 6/2010 | Keren | |
| 2012/0097254 A1 | 4/2012 | Cohen | |
| 2012/0199673 A1 * | 8/2012 | Cohen | A01G 25/023 239/542 |
| 2012/0305676 A1 | 12/2012 | Keren | |
| 2015/0090815 A1 | 4/2015 | Akritanakis | |
| 2015/0150199 A1 | 6/2015 | Kidachi | |
| 2016/0198643 A1 * | 7/2016 | Cohen | A01G 25/023 239/542 |
| 2016/0219803 A1 * | 8/2016 | Keren | B05B 1/30 |
| 2017/0142916 A1 * | 5/2017 | Shamshery | B05B 1/3006 |
| 2017/0290277 A1 * | 10/2017 | Cohen | A01G 25/023 |
| 2018/0098514 A1 * | 4/2018 | Socolsky | A01G 25/023 |
| 2018/0168117 A1 * | 6/2018 | Noguchi | A01G 25/16 |
| 2018/0317406 A1 * | 11/2018 | Tsouri | A01G 25/023 |
| 2018/0338434 A1 * | 11/2018 | Wlassich | A01G 25/023 |
| 2019/0183074 A1 * | 6/2019 | Morikoshi | F04B 43/02 |
| 2020/0288653 A1 * | 9/2020 | Socolsky | A01G 25/023 |
| 2021/0037726 A1 * | 2/2021 | Yanagisawa | A01G 25/023 |
| 2022/0046869 A1 * | 2/2022 | Sokol | G06F 30/17 |
| 2022/0046870 A1 * | 2/2022 | Sokol | A01G 25/023 |

FOREIGN PATENT DOCUMENTS

| | | |
|---|---|---|
| EP | 3305065 A1 | 4/2018 |
| ES | 2229889 B1 | 7/2006 |
| WO | 1984002828 A1 | 8/1984 |

OTHER PUBLICATIONS

Zhang, J., et al., "Structural Optimization of Labyrinth-Channel Emitters Based on Hydraulic and Anti-Clogging Performances," Irrig. Sci., 29(5), pp. 351-357, 2011.
Zhangzhong, L., et al., "Flow Characteristics and Pressure-Compensating Mechanism of Non-Pressure-Compensating Drip Irrigation Emitters," Irrig. Drain., 64(5), pp. 637-646, 2015.
Zhao, W., et al., "Research on Transitional Flow Characteristics of Labyrinth Channel Emitter," IFIP Int. Fed. Inf. Process., 294, pp. 881-890, 2009.
Al-Amoud, A. I., et al., "Impact of Water Temperature and Structural Parameters on the Hydraulic Labyrinth-Channel Emitter Performance," Spanish J. Agric. Res., 12(3), pp. 580-593, 2014.
Al-Muhammad, J., et al., "Modeling a Weak Turbulent Flow in a Narrow and Wavy Channel: Case of Micro-irrigation," Irrig. Sci., 34(5), pp. 361-377, 2016.
Bernstein, L., et al., "Comparisons of Drip, Furrow, and Sprinkler Irrigation," Soil Sci., 115(1), pp. 73-86, 1973.
Burney, J., et al., "Solar-Powered Drip Irrigation Enhances Food Security in the Sudano-Sahel," Proc. Natl. Acad. Sci. U. S. A., 107(5), pp. 1848-1853, 2010.
Celik, H. K., et al., "Rapid Prototyping and Flow Simulation Applications in Design of Agricultural Irrigation Equipment: Case Study for a Sample in-Line Drip Emitter," Virtual Phys. Prototyp., 6(1), pp. 47-56, 2011.
Cetin, O., et al., "Effects of Different Irrigation Methods on Shedding and Yield of Cotton," Agric. Water Manag., 54(1), pp. 1-15, 2002.
Chinadrip, 2020, "Drip Tape and Fitting" [Online]. Available: https://www.chinadrip.com/drip-tape-and-fitting_c31. [Accessed: Apr. 14, 2020].
Dazhuang, Y., et al., "Numerical Study on Flow Property in Dentate Path of Drip Emitters," New Zeal. J. Agric. Res., 5007, pp. 705-712, 2007.
Edwards, M. F., et al., "Head Losses in Pipe Fittings at Low Reynolds Numbers," Chem. Eng. Res. Des., 63(1), pp. 43-50, 1985.
FAO, The State of the World's Land and Water Resources for Food and Agriculture: Managing Systems at Risk, Rome, Italy, 2011.
Feng, J., et al., "Effect of Optimization Forms of Flow Path on Emitter Hydraulic and Anti-Clogging Performance in Drip Irrigation System," Irrig. Sci., 36(1), pp. 37-47, 2018.
Foley, J. A., et al., "Solutions for a Cultivated Planet," Nature, 478(7369), pp. 337-342, 2011.
Ghamarnia, H., et al., "Evaluation and Comparison of Drip and Conventional Irrigation Methods on Sugar Beets in a Semiarid Region," J. Irrig. Drain. Eng., 138(1), pp. 90-97, 2011.
Hanson, B. R., et al., "A Comparison of Furrow, Surface Drip, and Subsurface Drip Irrigation on Lettuce Yield and Applied Water," Agric. Water Manag., 33(2-3), pp. 139-157, 1997.
Ibragimov, N., et al., "Water Use Efficiency of Irrigated Cotton in Uzbekistan under Drip and Furrow Irrigation," Agric. Water Manag., 90(1-2), pp. 112-120, 2007.
ICID, Annual Report 2017-2018: Agricultural Water Management for Sustainable Rural Development, New Delhi, India, 2018.
Idelchik, I. E., "Handbook of Hydraulic Resistance," 4th Edition, 2007.
Indian Office Action for Application No. 201847022701, issued Nov. 27, 2020 (5 pages).
International Preliminary Report on Patentability for Application No. PCT/US2016/053686, mailed May 31, 2018 (10 Pages).
International Search Report and Written Opinion for Application No. PCT/US2016/053686, mailed Dec. 14, 2016 (12 Pages).
International Search Report and Written Opinion for Application No. PCT/US2021/045978, mailed Nov. 16, 2021 (16 pages).
Jagermeyr, J., et al., "Water Savings Potentials of Irrigation Systems: Global Simulation of Processes and Linkages," Hydrol. Earth Syst. Sci., 19(7), pp. 3073-3091, 2015.
Jain Irrigation Systems Ltd., 2019, "Jain Turbo Cascade PC, PCNL & PCAS" [Online]. Available: https://www.jains.com/irrigation/emitting pipe/turbo cscade pc ponl pcas.htm. [Accessed: Apr. 14, 2020].
Li, Y., et al., "CFD and Digital Particle Tracking to Assess Flow Characteristics in the Labyrinth Flow Path of a Drip Irrigation Emitter," Irrig. Sci., 26, pp. 427-438, 2008.
Maisiri, N., et al., "On Farm Evaluation of the Effect of Low Cost Drip Irrigation on Water and Crop Productivity Compared to Conventional Surface Irrigation System," Phys. Chem. Earth, 30, pp. 783-791, 2005.
Mattar, M. A., et al., "Artificial Neural Networks for Estimating the Hydraulic Performance of Labyrinth-Channel Emitters," Comput. Electron. Agric., 114, pp. 189-201, 2015.
Mattar, M. A., et al., "Hydraulic Performance of Labyrinth-channel Emitters: Experimental Study, ANN, and GEP Modeling," Irrig. Sci., 2019.
Narain, J., et al., "A Hybrid Computational and Analytical Model of Inline Drip Emitters," J. Mech. Des., 141(7), p. 71405, 2019.
Narayanamoorthy, A., "Impact Assessment of Drip Irrigation in India: The Case of Sugarcane," Dev. Policy Rev., 22(4), pp. 443-462, 2004.
Netafim, 2020, "Heavywall Driplines" [Online]. Available: https://www.netafimusa.com/agriculture/products/product-offering/heavywall-driplines/. [Accessed: Apr. 14, 2020].

(56) References Cited

OTHER PUBLICATIONS

Nishimura, T., et al., "Flow Characteristics in Channel With Symmetric Wavy Wall for Steady Flow," Organ. by Korean Inst Chem. Eng., pp. 13-18, 1983.

Philipova, N., et al., "Mathematical Modeling of Drip Emitter Discharge of Triangular Labyrinth Channel," Comptes rendus l'Academie Bulg. des Sci., 64(1), 2011.

Philipova, N., et al., "Regression Equations of Pressure Losses of Rectangular Labyrinth Channel and Bi-Objective Optimization," Comptes rendus l'Academie Bulg. des Sci., 64(12), pp. 1749-1756, 2011.

Phocaides, A., Handbook on Pressurized Irrigation Techniques, Food and Agriculture Organization of the United Nations (FAO), Rome, Italy, 2007.

Postel, S., et al., "Drip Irrigation for Small Farmers: A New Initiative to Alleviate Hunger and Poverty," Water Int., 26(1), pp. 3-13, 2001.

Rainbird, 2020, "Drip Irrigation" [Online]. Available: https://www.rainbird.com/agriculture/products/drip-irrigation. [Accessed: Apr. 14, 2020].

Shamshery, P., et al., "Modeling the Future of Irrigation: A Parametric Description of Pressure Compensating Drip Irrigation Emitter Performance," PLoS One, 12(4), 2017.

Shamshery, P., et al., "Shape and Form Optimization of On-Line Pressure-Compensating Drip Emitters to Achieve Lower Activation Pressure," J. Mech. Des., 140, pp. 35001-35001-7, 2018.

Sokol, J., et al., "Energy Reduction and Uniformity of Low-Pressure Online Drip Irrigation Emitters in Field Tests," Water (Switzerland), 11(6), 2019.

Szilard, R., Theories and Applications of Plate Analysis, John Wiley & Sons, Inc., Hoboken, NJ, 2003.

Taylor et al., "A Mathematical Model for Pressure Compensating Emitters," Proceedings of the 2015 Idetc Asme 2015 International Design Engineering Technical Conference, pp. 1-10, New York, USA, 2015.

Tian, W., "A Review of Sensitivity Analysis Methods in Building Energy Analysis," Renew. Sustain. Energy Rev., 20, pp. 411-419, 2013.

Ventsel, E., et al., Thin Plates and Shells, Marcel Dekker, Inc., New York, NY, 2001.

Wang, L., et al., "Rapid Stereotype of Cylindrical Drip Emitter Based on Computational Fluid Dynamics and Rapid Prototyping Manufacturing," Appl. Mech. Mater., 190-191, pp. 390-394, 2012.

Wang, W., et al., "A Hydraulic Analysis of an Online Pressure Compensating Emitter Using CFD-CSD Technology," 2012 ASABE Annual International Meeting, 2012.

Wei, Q., et al., "Study on Hydraulic Performance of Drip Emitters by Computational Fluid Dynamics," Agric. Water Manag., 84(1-2), pp. 130-136, 2006.

Wei, Z., "The Step-by-Step CFD Design Method of Pressure-Compensating Emitter," Eng. Sci., 11(1), 2013.

Woltering, L., et al., "The Economics of Low Pressure Drip Irrigation and Hand Watering for Vegetable Production in the Sahel," Agric. Water Manag., 99(1), pp. 67-73, 2011.

Wu, D., et al., "Simulation of the Flow Characteristics of a Drip Irrigation Emitter with Large Eddy Methods," Math. Comput. Model., 58(3-4), pp. 497-506, 2013.

Yu, L., et al., "The Mechanism of Emitter Clogging Analyzed by CFD-DEM Simulation and PTV Experiment," Adv. Mech. Eng., 10(1), pp. 1-10, 2018.

\* cited by examiner

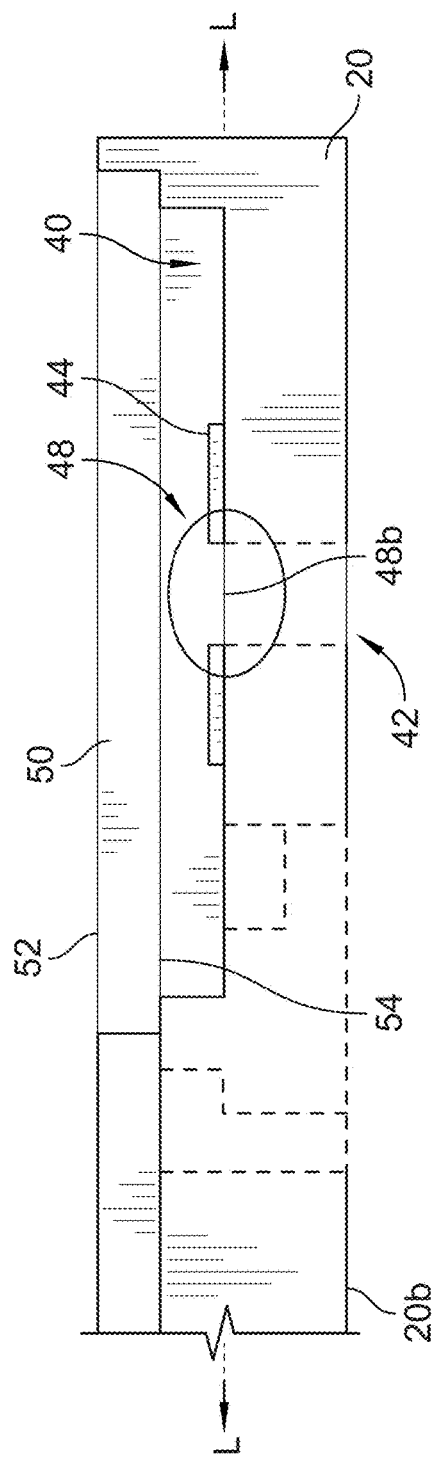
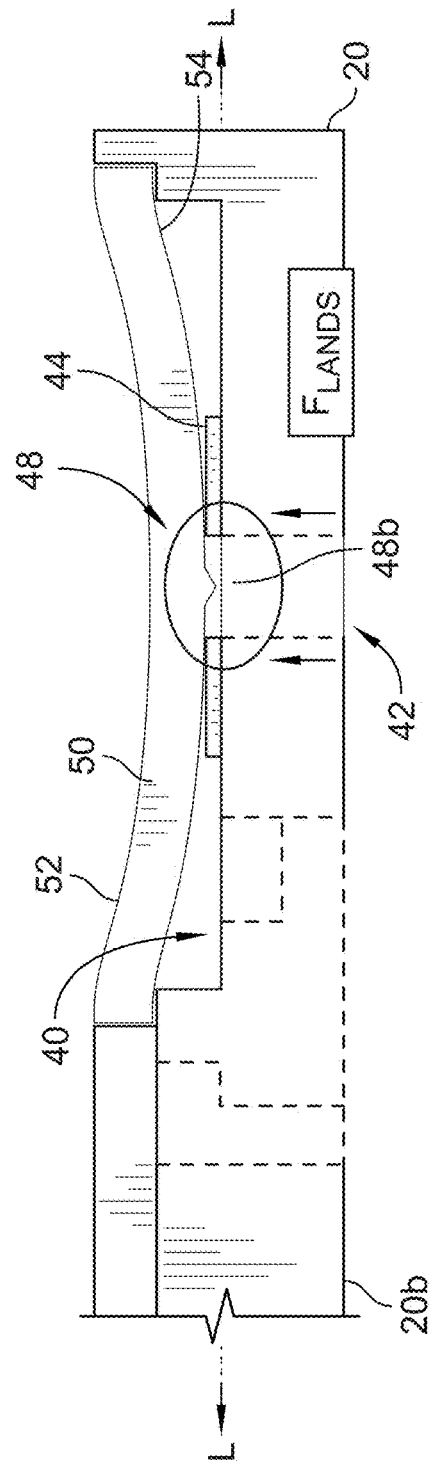

SYSTEMS AND METHODS FOR DESIGNING AND MODELING PRESSURE-COMPENSATING DRIP EMITTERS, AND IMPROVED DEVICES IN VIEW OF THE SAME

CROSS REFERENCE TO RELATED APPLICATIONS

This application claims priority to and the benefit of U.S. Provisional Patent Application No. 63/065,491, entitled "Systems and Methods for Designing and Modeling Pressure-Compensating Drip Emitters, and Improved Devices in View of the Same," filed Aug. 13, 2020, the content of which is incorporated by reference herein in its entirety.

GOVERNMENT RIGHTS

This invention was made with Government support under Grant No. AID-OAA-A-16-00058 awarded by the U.S. Agency for International Development. The Government has certain rights in the invention.

FIELD

The present disclosure relates to drip irrigation emitters, and more particularly relates to modeling or otherwise designing such emitters to achieve low activation pressures while maintain desired flow rates. The disclosure also provides for devices formulated by relying upon the disclosed modeling and designing.

BACKGROUND

Drip irrigation systems and methods are used to deliver water and/or nutrients directly to the root zone of a plant. The water and/or nutrients are pumped into a system to flow along a delivery path (e.g., a network of water lines or pipes) that is set-up in the ground of a field of crops. The path includes outlets proximate to the root zone of the plants such that the water and/or nutrients flow through the delivery path and exit the outlets to be delivered to the root zone of the respective plants.

Such systems often include drip irrigation emitters disposed along the delivery path to aid in delivering water and/or nutrients to desired locations in a controlled, often more uniform, manner. More particularly, the drip irrigation emitters can be disposed within, referred to herein as being inline with the delivery path (i.e., bonded to the inside of the irrigation tubing), or external to the delivery path, referred to herein as being online (i.e., inserted manually into holes on the exterior of the irrigation tubing). Such emitters are typically spaced a desired distance(s) apart throughout the delivery path. Each emitter discharges or otherwise delivers the water and/or nutrients to a nearby root zone of a plant. As a result of this controlled, targeted water and/or nutrients delivery, it is possible to irrigate with substantially less water and/or nutrients as compared to conventional delivery systems including sprinklers and flooding methods. Further, drip irrigation systems also experience less water percolation, surface run off, or evaporation, all resulting in saving water. Other advantages include fewer weeds, as water is applied only to regions where it is required, and the use of less fertilizer due to targeted watering and better soil moisture levels providing for higher crop yields. Larger scale, global advantages include helping to address water scarcity issues and insufficient crop yields.

Pressure-compensating (PC) drip emitters have been developed that emit a constant flow rate of water despite fluctuations in input water pressure. The PC drip emitters regulate the emitter flow rate along a length of the delivery path, thus enabling longer lateral pipes and the like to be used so that a larger area can be irrigated with drip irrigation systems.

Despite the numerous benefits of drip irrigation systems and methods, including increased crop production with lower on-farm water consumption than other irrigation methods, its typically high costs keep such systems and methods out of reach for many smallholder farmers. The high costs result, for example, from needing high pumping pressures to operate sustainably, causing high capital and operating costs for the pump and associated power system. This can be particularly problematic for small and/or remote farms where costs to bring in power can be particularly high. Some such farms may be off the electrical grid (referred to sometimes as "off-grid"), and the cost of obtaining systems for obtaining power to remain off-grid, such as solar panels or arrays, solar-powered pumps, and wind turbines, can be expensive. The less amount of power that is needed to run an irrigation system, the cheaper it will be to produce crops.

FIG. 1A illustrates one example of a known PC drip emitter 10 disposed inline of a delivery path, as shown bonded to the inside of irrigation tubing 100. The PC drip emitter 10, illustrated in more detail in FIGS. 1B and 1C, includes a body 20 having a flow path 30 formed therein and membrane cavity 40, a membrane 50 disposed within the membrane cavity 40, and a cover 60 that is coupled to the body 20, for example by ultrasonically welding the two components together. The cover 60 includes an inlet 62 through which a fluid, such as water, can enter the emitter 10. More particularly, as shown in FIG. 1D, water can pass from the inlet 62, as shown by FIG. 1B above the membrane 50 on a side of the membrane 50 opposite of the membrane cavity 40, and through the flow path 30 from a terminal entry point 32 to a terminal exit point 34, disposed at opposite ends of the flow path 30, respectively. As water passes through the flow path 30, a change in pressure occurs, the pressure dropping such that the water pressure at the terminal entry point 32 is greater than the water pressure at the terminal exit point 34. The terminal exit point 34 includes an opening 36 that is in fluid communication with an opening 46 formed in the membrane cavity 40, the opening 46 being disposed below the membrane 50, i.e., on a side of the membrane 50 opposite of the inlet 62 formed in the cover 60. This fluid communication can be provided, for example, by a fluid path 38. The water then enters the membrane cavity 40 and flows towards an outlet 42 formed in the membrane cavity 40. The outlet 42 is in fluid communication with an outside environment such that the water flows out of the outlet 42 and to a desired delivery location, such as the root zone of a plant. The term "outside environment" encompasses any environment that is outside of the emitter 10 itself, and thus an outside environment is not necessarily outside in the ground or air; the outside environment can be an inside controlled environment that is still "outside" of the emitter. While the size and shape of the emitter 10 will depend on a variety of factors, including but not limited to the intended use, the size and shape of other components with which it will be used (e.g., other emitters, tubing to which the emitter is attached, etc.), and factors associated with the environment in which the emitter will be used, emitters can often have rectangular prism shape with a length l approximately in the range of about 20 millimeters to about 60 millimeters, a width w approximately in the range of about 7 millimeters to about 15 millimeters, and a height h approximately in the range of about 3 millimeters to about 10 millimeters.

FIGS. 1E-1G illustrates a typical set-up in the membrane cavity 40 that enables the fluid entering the cavity 40 via the flow path 30 to pass through the membrane cavity 40 and through the outlet 42 to the desired delivery location. As shown, the membrane cavity 40 typically includes a land or lands 44 formed in the cavity 40, with the land 44 surrounding the outlet 42. The land 44 is raised with respect to a bottom surface 40b of the membrane cavity 40. Formed in the land 44 is a channel 48 that is in fluid communication with the outlet 42. The channel 48 extends through a thickness of the land 44 but has a terminal bottom surface 48b defined by the bottom surface 40b of the membrane cavity 40. Alternatively, the channel 48 can extend into a thickness of the body 20 that defines the membrane cavity 40, with the terminal bottom surface 48b terminating prior to the terminal bottom end of the body 20. Such a configuration is possible with or without a lands 44. That is, the depth of the channel 48 formed in the membrane cavity 40 to communicate with the outlet 42 terminates prior to a terminal bottom end 20b of the body 20 (FIGS. 1B and 1C, the portion not visible that forms a body of the body 20). Accordingly, while the outlet 42 communicates directly with an outside environment, the channel 48 does not because fluid flowing through the channel 48 can only enter the outside environment after passing through the outlet 42. In many configurations, the channel has a width approximately in the range of about 0.01 millimeters to about 0.10 millimeters. Pressure compensation in these channeled designs can be achieved, for example, by altering a cross-sectional flow area underneath the membrane 50 and/or altering the covered area of the outlet 42.

More particularly, a flow resistance of the channel 48 is very sensitive to small changes in membrane 50 deformation, the membrane typically being flexible or compliant, thus allowing the emitter 10 to keep flow rate constant as pressure changes. This holds true as long as an inlet pressure is above a minimum activation pressure. For example, as shown in FIGS. 1F and 1G, the pressure is approximately 0 bar when the membrane 50 is stationary (FIG. 1F), as represented by opposed facing surfaces 52 and 54 of the membrane being substantially flat and substantially parallel with respect to a longitudinal axis L-L extending through an entire length of the emitter 10, but as water flows through the emitter 10 and a pressure drop occurs, the membrane 50 deflects towards the lands 44 (at least sometimes contacting the lands 44), creating a pressure within the membrane cavity 40 (FIG. 1G) and causing the membrane 50 to deflect downwards such that the opposed facing surfaces 52 and 54 have concave configurations. The displacement of the membrane 50 is due, at least in part, to the pressure of the water above the membrane 50 being higher than the pressure of water below the membrane 50. The pressure P in the membrane cavity 40 to induce fluid flow out of the outlet 42 is greater than an activation pressure $P_{act}$, which is typically about 0.4 bars or greater in most conventional inline PC drip emitters (typically approximately in the range of about 0.4 bars to about 1.0 bar, which is approximately in the range of about 40 kPA to about 100 kPA). As shown in FIG. 1G, a force $F_{lands}$ helps to drive water through the channel 48, for instance by capillary action. Water thus flows through the channel 48, between the terminal bottom surface 48b of the channel 48 and the bottom surface 54 of the membrane 50, and then out of the outlet 42 to an outside environment. As a result, a series of PC emitters can provide a more uniform water application to all crops in a field, even with uneven terrain, while also allowing for longer pipes and more freedom in a hydraulic network design. Notably, the small dimensions of the channel 48 make it prone to clogging, for instance due to particles in the water and/or nutrients. Typical channel cross-section dimensions are approximately 0.10 millimeters by about 0.50 millimeters.

Reducing an activation pressure of an emitter can help drive down power costs. However, doing so must be balanced by achieving a suitable constant flow rate that enables the irrigation system to provide irrigation across its length. Presently, efforts to reduce activation pressures and achieve certain constant flow rates are primarily achieved through trial-and-error, for instance by modifying existing, previously-proven commercial designs. Few, if any, mathematical models, design theories, and/or other efforts to balance these competing interests appear to have been formulated or relied upon in designing PC drip emitters to date. Even to the extent existing work can be characterized as involving design theory, the work appears to be quite time-intensive to run, requiring multiple software tools, limiting its utility for early-stage parametric design of new design geometries.

Accordingly, there is a need for systems and methods to aid in designing PC drip emitters that can achieve low activation pressures while maintaining suitable constant flow rates. There is likewise a need for drip irrigation emitters that have improved performance due to low activation pressures to allow for reduced power requirements.

SUMMARY

The present disclosure provides for analytical, parametric systems and methods for designing PC drip emitters, evaluating their hydraulic performance based on activation pressures and flow rates. It also provides for PC drip emitters that have improved performance at least in part because they were designed based on the systems and methods disclosed herein. At least one of the emitter designs demonstrates an activation pressure that is approximately 38% lower than commercial emitters while achieving similar flow rates. Further, the analytical models and design procedures provided for herein can be used by persons skilled in the art in conjunction with more detailed numerical models of behavior after activation to design PC emitters with desired activation pressure and flow rates.

One exemplary method of reducing an activation pressure in a pressure-controlled drip irrigation emitter while maintaining a substantially constant flow rate includes adjusting at least one of the following variables that impacts an activation pressure and a flow rate of a pressure-controlled drip irrigation emitter having a body by: (1) decreasing a resistance of a flow path formed in the body of the emitter; (2) decreasing a resistance of a membrane cavity formed in the body of the emitter; (3) decreasing a distance between a membrane disposed above a bottom surface of a membrane cavity of the body of the emitter and a top surface of a lands disposed in the membrane cavity; (4) decreasing a thickness of a membrane disposed above a membrane cavity of the body of the emitter; (5) increasing a length or a width of a membrane disposed above a membrane cavity of the body of the emitter; or (6) decreasing a flexural modulus of a membrane disposed above a membrane cavity of the body of the emitter. A result of the adjusting is an activation pressure approximately in the range of about 0.1 bar to about 0.3 bar.

Adjusting at least one of the aforementioned variables that impacts an activation pressure and a flow rate of a pressure-controlled drip irrigation emitter having a body can include adjusting at least two of those variables (or more than two if desired). One of the two (or more) variables can include the resistance of the flow path formed in the body of the emitter. Additionally, or alternatively, one of the variables can include the distance between the membrane disposed above the bottom surface of the membrane cavity of the body of the emitter and the top surface of the lands disposed in the membrane cavity. Additionally, or alternatively, one of the variables can include the resistance of the membrane cavity formed in the body of the emitter. Additionally, or alternatively, one of the variables can include at least one of the length, the width, and/or the thickness of the membrane disposed above the membrane cavity of the body of the emitter. Additionally, or alternatively, one of the variables can include the flexural modulus of the membrane disposed above the membrane cavity of the body of the emitter. Each of these variables, as well as others provided for herein, can be mixed and matched as desired to model, design, test, and/or manufacture pressure-controlled drip irrigation emitters.

Decreasing a resistance of a flow path formed in the body of the emitter can include decreasing a length of the flow path. Decreasing a flexural modulus of a membrane disposed above a membrane cavity of the body of the emitter can include decreasing at least one a Young's modulus of the membrane or a Poisson's ratio of the membrane.

The action of adjusting at least one of the variables that impacts an activation pressure and a flow rate of a pressure-controlled drip irrigation emitter having a body can be controlled by:

$$P_{act} = \frac{Dh_{lands}(K_{path} + K_{chamber})}{\alpha_1 K_{path} + \alpha_2 K_{chamber} \frac{\pi r_{out}^2}{ab}}.$$

In such instances:
$P_{act}$ can be the activation pressure,
D can be the flexural modulus,
$h_{lands}$ can be the distance between the membrane disposed above the bottom surface of the membrane cavity of the body of the emitter and the top surface of the lands disposed in the membrane cavity,
$K_{path}$ can be the resistance of the flow path formed in the body of the emitter,
$K_{chamber}$ can be the resistance of the membrane cavity formed in the body of the emitter,
$\alpha_1$ can be a first constant of a deflection expression of the membrane,
$\alpha_2$ can be a second constant of a deflection expression of the membrane,
r can be a radius of an outlet formed in the membrane cavity,
a can be a length of the membrane cavity, and
b can be a width of the membrane cavity.

The action of adjusting at least one of the variables that impacts an activation pressure and a flow rate of a pressure-controlled drip irrigation emitter having a body can be controlled by:

$$Q_{act} = \left( \frac{Dh_{lands}}{\alpha_1 K_{path} + \alpha_2 K_{chamber} \frac{\pi r_{out}^2}{ab}} \right)^{1/2}.$$

In such instances:
$Q_{act}$ can be the flow rate,
D can be the flexural modulus,
$h_{lands}$ can be the distance between the membrane disposed above the bottom surface of the membrane cavity of the body of the emitter and the top surface of the lands disposed in the membrane cavity,
$\alpha_1$ can be a first constant of a deflection expression of the membrane,
$K_{path}$ can be the resistance of the flow path formed in the body of the emitter,
$\alpha_2$ can be a second constant of a deflection expression of the membrane,
$K_{chamber}$ can be the resistance of the membrane cavity formed in the body of the emitter,
r can be a radius of an outlet formed in the membrane cavity,
a can be a length of the membrane cavity, and
b can be a width of the membrane cavity.

One exemplary method of at least one of designing, testing, or manufacturing a pressure-controlled drip irrigation emitter includes at least one of: (1) decreasing a resistance of a flow path formed in a body of a pressure-controlled drip irrigation emitter; (2) decreasing a resistance of a membrane cavity formed in a body of a pressure-controlled drip irrigation emitter; (3) decreasing a distance between a membrane disposed above a bottom surface of a membrane cavity of a body of a pressure-controlled drip irrigation emitter and a top surface of a lands disposed in the membrane cavity; (4) decreasing a thickness of a membrane disposed above a membrane cavity of a body of a pressure-controlled drip irrigation emitter; (5) increasing at least one of a length or a width of a membrane disposed above a membrane cavity of a body of a pressure-controlled drip irrigation emitter; or (6) decreasing a flexural modulus of a membrane disposed above a membrane cavity of a body of a pressure-controlled drip irrigation emitter. A result of the decreasing is an activation pressure approximately in the range of about 0.1 bar to about 0.3 bar.

In some embodiments at least two of the decreasing or increasing actions can be performed (or more than two if desired). One of the two (or more) actions can include decreasing the resistance of the flow path formed in the body of the pressure-controlled drip irrigation emitter. Additionally, or alternatively, one of the actions can include decreasing the distance between the membrane disposed above the bottom surface of the membrane cavity of the body of the pressure-controlled drip irrigation emitter and the top surface of the lands disposed in the membrane cavity. Additionally, or alternatively, one of the actions can include decreasing the resistance of the membrane cavity formed in the body of the pressure-controlled drip irrigation emitter. Additionally, or alternatively, one of the actions can include decreasing the thickness of the membrane disposed above the membrane cavity of the body of the pressure-controlled drip irrigation emitter. Additionally, or alternatively, one of the actions can include increasing at least one of the length or the width of the membrane disposed above the membrane cavity of the body of the pressure-controlled drip irrigation emitter. Additionally, or alternatively, one of the actions can include decreasing the flexural modulus of the membrane disposed above the membrane cavity of the body of a pressure-controlled drip irrigation emitter. Each of these actions, as well as others provided for herein, can be mixed and matched as desired to model, design, test, and/or manufacture pressure-controlled drip irrigation emitters.

Decreasing a resistance of a flow path formed in the body of the emitter can include decreasing a length of the flow path. Decreasing a flexural modulus of a membrane disposed above a membrane cavity of the body of the emitter can include decreasing at least one a Young's modulus of the membrane or a Poisson's ratio of the membrane.

At least one of the actions of decreasing or increasing can be controlled by:

$$P_{act} = \frac{Dh_{lands}(K_{path} + K_{chamber})}{\alpha_1 K_{path} + \alpha_2 K_{chamber}\frac{\pi r_{out}^2}{ab}}.$$

In such instances:
$P_{act}$ can be the activation pressure,
D can be the flexural modulus,
$h_{lands}$ can be the distance between the membrane disposed above the bottom surface of the membrane cavity of the body of the emitter and the top surface of the lands disposed in the membrane cavity,
$K_{path}$ can be the resistance of the flow path formed in the body of the emitter,
$K_{chamber}$ can be the resistance of the membrane cavity formed in the body of the emitter,
$\alpha_1$ can be a first constant of a deflection expression of the membrane,
$\alpha_2$ can be a second constant of a deflection expression of the membrane,
r can be a radius of an outlet formed in the membrane cavity,
a can be a length of the membrane cavity, and
b can be a width of the membrane cavity.

At least one of the actions of decreasing or increasing can be controlled by:

$$Q_{act} = \left(\frac{Dh_{lands}}{\alpha_1 K_{path} + \alpha_2 K_{chamber}\frac{\pi r_{out}^2}{ab}}\right)^{1/2}.$$

In such instances:
$Q_{act}$ can be the flow rate,
D can be the flexural modulus,
$h_{lands}$ can be the distance between the membrane disposed above the bottom surface of the membrane cavity of the body of the emitter and the top surface of the lands disposed in the membrane cavity,
$\alpha_1$ can be a first constant of a deflection expression of the membrane,
$K_{path}$ can be the resistance of the flow path formed in the body of the emitter,
$\alpha_2$ can be a second constant of a deflection expression of the membrane,
$K_{chamber}$ can be the resistance of the membrane cavity formed in the body of the emitter,
r can be a radius of an outlet formed in the membrane cavity,
a can be a length of the membrane cavity, and
b can be a width of the membrane cavity.

A computer system can be provided that is configured to perform any or all of the aforementioned methods, actions, etc. provided for above.

One exemplary pressure-controlled drip irrigation emitter includes an inlet, a body, a membrane cavity, an outlet, a membrane, and a flow path. The membrane cavity is formed in the body and has an opening formed in it, the outlet is in fluid communication with the membrane cavity, and the membrane is disposed above a bottom surface of the membrane cavity. The flow path is formed in the body and includes an entry point that is in fluid communication with the inlet and an exit point that is in fluid communication with the opening formed in the membrane cavity. The flow path is configured to decrease a pressure of fluid flowing through the path as the fluid passes from the entry point to the exit point. A length of the flow path is substantially less than lengths of known flow paths.

In some embodiments an activation pressure of the emitter can be approximately in the range of about 0.1 bar to about 0.3 bar. For example, the activation pressure can be approximately 0.15 bar. A flow rate of the emitter once activated can be approximately in the range of about 0.1 liters per hour to about 8.0 liters per hour. In some embodiments the flow rate of the emitter once activated can be approximately in the range of about 2.0 liters per hour to about 3.5 liters per hour. In some embodiments the flow rate of the emitter once activated can be approximately in the range of about 2.25 liters per hour to about 3.0 liters per hour.

The emitter can include a cover coupled to the body. The inlet can be disposed in the cover. The emitter can include a lands disposed on a bottom surface of the membrane cavity.

BRIEF DESCRIPTION OF DRAWINGS

This disclosure will be more fully understood from the following detailed description taken in conjunction with the accompanying drawings, in which:

FIG. 1F is a cross-sectional back view of the membrane cavity of FIG. 1D taken along line A-A, the membrane of the drip emitter being in an inactivated state;

FIG. 1G is the cross-sectional back view of the membrane cavity of FIG. 1F, the membrane of the drip emitter being in an activated state;

DESCRIPTION

Figure 1A:
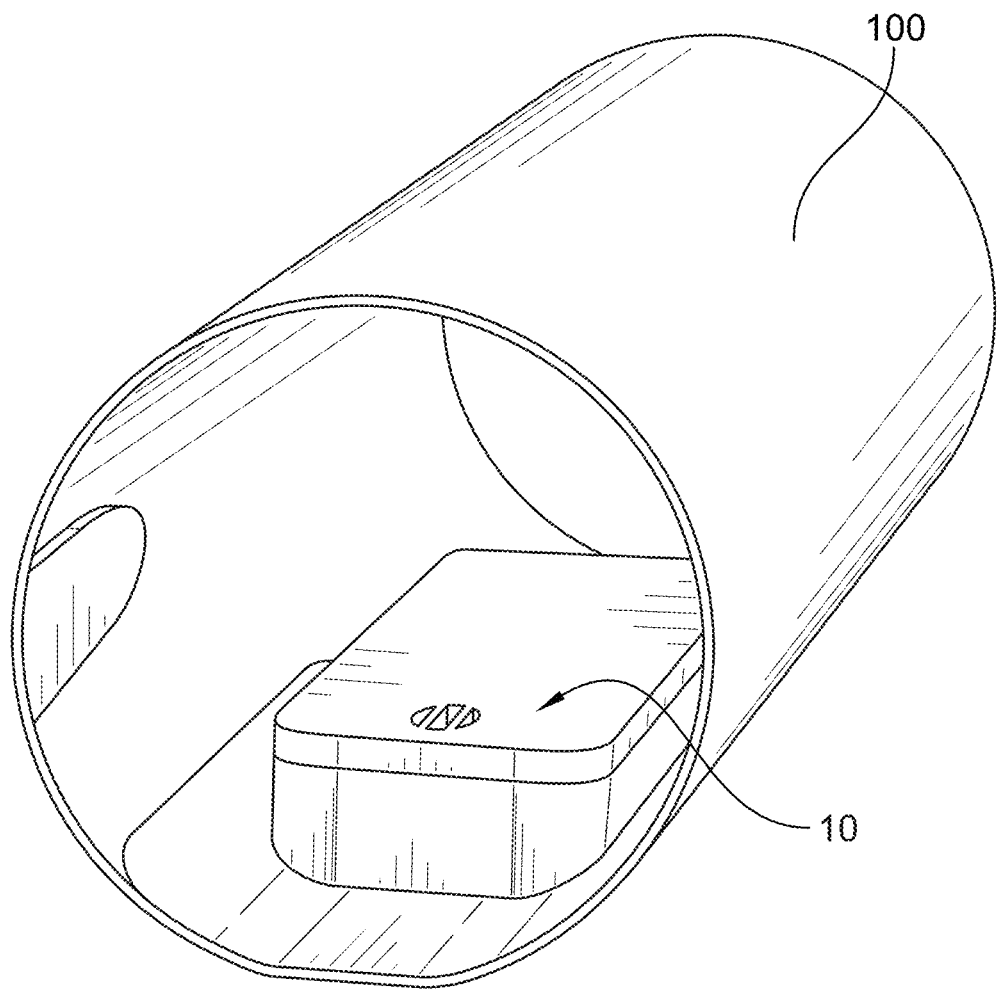
FIG. 1A is a perspective view of a known PC drip emitter bonded to an inner surface of a portion of an irrigation tube.
Figure 1B:
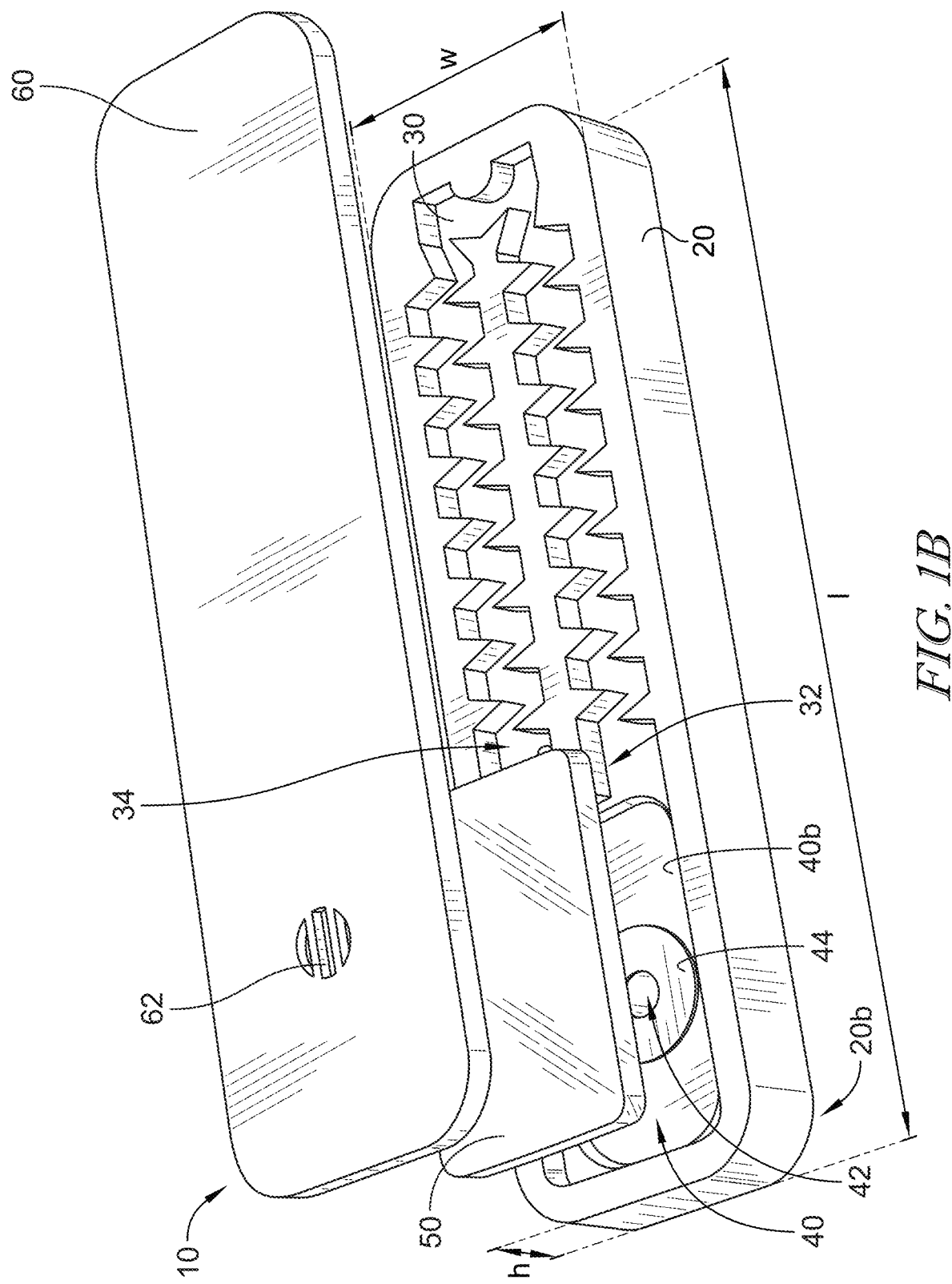
FIG. 1B is an exploded view of the known PC drip emitter of FIG. 1A, the drip emitter including a cover, a membrane, and a body.
Figure 1C:
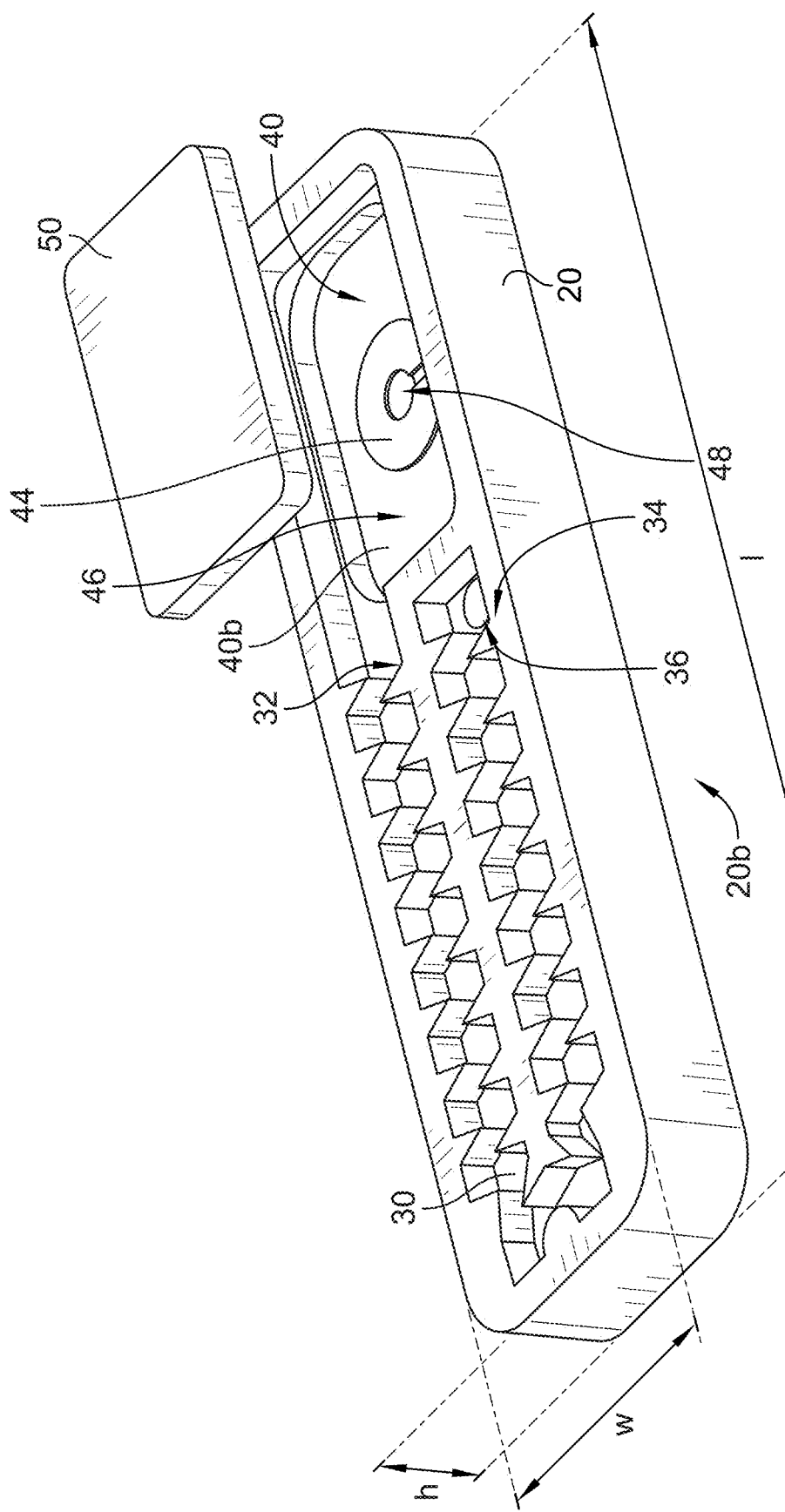
FIG. 1C is a perspective view of the PC drip emitter of FIG. 1B, including the body and the membrane.
Figure 1D:
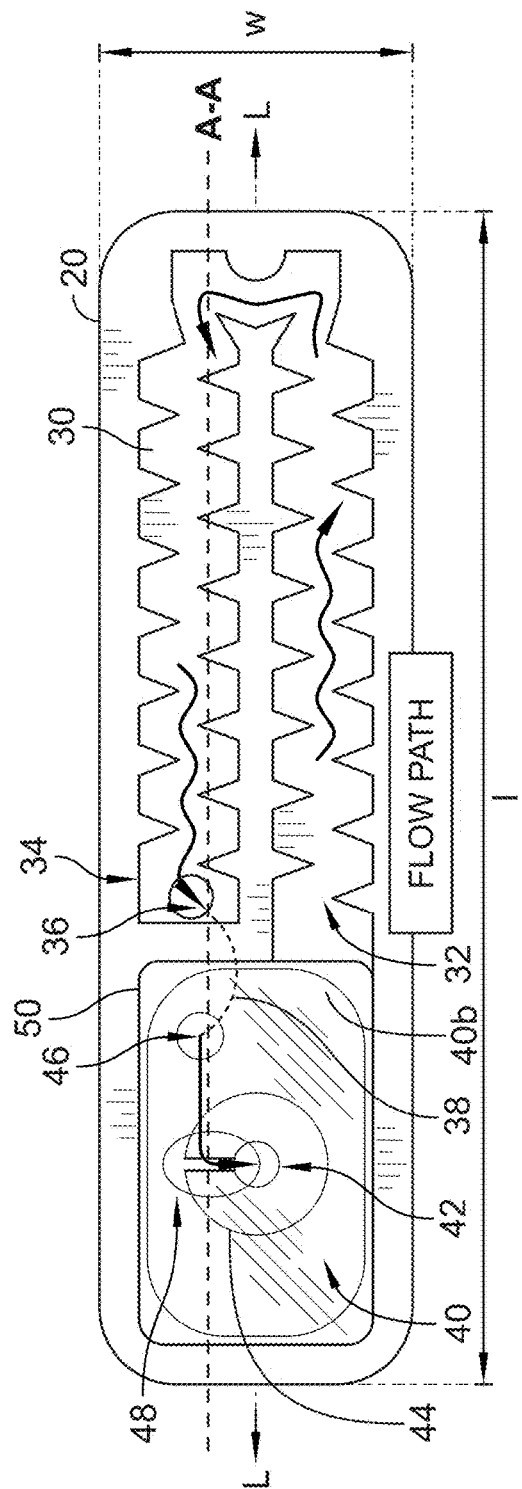
FIG. 1D is a top view of the body of the PC drip emitter of FIG. 1C.
Figure 1E:
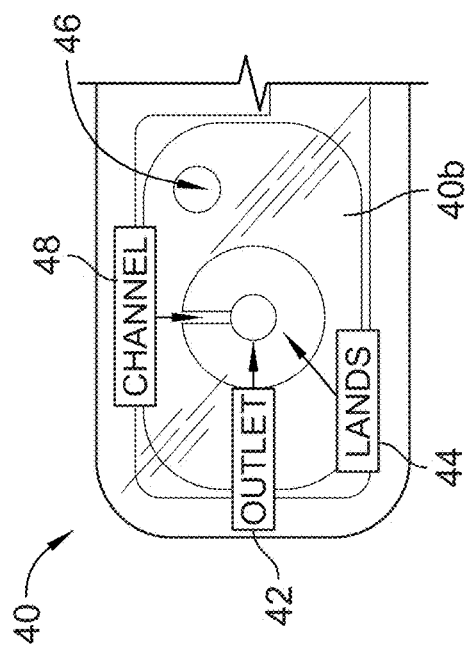
FIG. 1E is a top view of a membrane cavity of the body of FIG. 1D.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features and functionality when those components are of a similar nature and/or serve a similar purpose.

To the extent features, sides, components, steps, or the like are described as being "first," "second," "third," etc., such numerical ordering is generally arbitrary, and thus such numbering can be interchangeable. Likewise, to the extent features are described as being disposed on top of, below, next to, etc. such descriptions are typically provided for convenience of description, and a person skilled in the art will recognize that, unless stated or understood otherwise, other locations and positions are possible without departing from the spirit of the present disclosure. Still further, the present disclosure includes some illustrations and descriptions that include prototypes, bench models, testing apparatuses, or schematic illustrations of set-ups. A person skilled in the art will recognize how to rely upon the present disclosures to integrate the systems and methods provided for into a product, for example for use in an irrigation system or for testing emitters (e.g., the apparatus illustrated and described with respect to FIG. 5A, the set-up illustrated for a "quick prototyping method", and the "experimental setup to automate the measurement of flow rates over a range of pressures").

The present disclosure is directed to systems and methods for designing, manufacturing, and/or testing PC drip emitters, as well as provides for exemplary embodiments of drip emitters in view of the same. Mathematical models are presented that help a person skilled in the art to design and improve emitters with more precision and planning as he or she no longer has to rely upon trial-and-error with endless testing to try and design a better emitter. Utilizing the systems and methods disclosed results in optimizing parameters such as low activation pressures while achieving desirable flow rates by making changes to specific parameters the models identify as having the most impact on the parameters to be optimized. As described herein, these parameters include: (1) flow resistance by altering a design of a flow path (e.g., the flow path 30), such as adjusting one or more of a height, depth, and shape of the tortuous path and/or altering the parameters $K_{path}$ and/or $K_{chamber}$; (2) a distance between a lands (e.g., the lands 44) and an outlet (e.g., the outlet 42), defined as $h_{lands}$; and/or (3) membrane (e.g., the membrane 50) parameters, including but not limited to a thickness, defined as t, a width, defined as w, and Young's modulus, defined as E. The impact of parameters of this nature are made clearer by studying Equations (10) and (11) as identified herein—the heart of the mathematical modeling provided for in the present disclosure. The resulting impact on the parameters includes experimentally-validated activation pressures approximately in the range of about 0.1 bar to about 0.3 bar while still achieving a flow rate of approximately 2 liters per hour, and in some embodiments the activation pressure can be approximately 0.1 bar while still achieving a flow rate of approximately 2 liters per hour. This is a reduction of about 75% or more from most commercial emitters, in which an activation pressure for that flow rate is typically in the range of about 0.4 bar to about 0.7 bar. As alluded to earlier, the reduction in activation pressure while maintaining a desirable flow rate can result in lower capitals costs, for example due to needing less powerful pumps and power systems, and lower energy use for pumping, resulting in energy and costs savings as well.

The present disclosure also provides for one or more PC emitters that take advantage of the systems and models provided for herein. For example, one such design provided for herein include a flow path length that is significantly shorter than flow path lengths of most commercial emitters. Other design improvements are also possible in view of the systems and methods disclosed, even if each design improvement is not explicitly illustrated in an exemplary emitter embodiment. For example, to the extent improved membranes or configurations between the lands and outlet are not illustrated, a person skilled in the art will understand how to design such an emitter for improved performance in view of the disclosed systems and methods.

Unless otherwise noted, the operation of the drip irrigation emitters provided for or otherwise described herein is similar to the emitter 10 of FIGS. 1A-1G. Accordingly, a description of the same, and/or an illustration of some components of the same (e.g., a cover, an inlet, and/or a membrane) is unnecessary. Moreover, additional embodiments of emitters, such as those that do not include lands and/or small channel(s), can also be utilized in conjunction with the present disclosures. Such embodiments include, for example, those described in a U.S. Patent Application entitled "Channel-Less Drip Irrigation Emitter and Methods of Using the Same," filed concurrently with the present application, and the contents of which is incorporated by reference herein in its entirety. Accordingly, the focus of the illustrated embodiments is on the design systems and models, and the resulting changes to the body of the emitters that results from the design systems and models.

As will be described in greater detail below, activation pressure $P_{act}$ and flow rate $Q_{act}$ scale with geometric and material parameters as modeled by Equations (10) and (11):

$$P_{act} = \frac{Dh_{lands}(K_{path} + K_{chamber})}{\alpha_1 K_{path} + \alpha_2 K_{chamber} \frac{\pi r_{out}^2}{ab}}, \tag{10}$$

$$Q_{act} = \left( \frac{Dh_{lands}}{\alpha_1 K_{path} + \alpha_2 K_{chamber} \frac{\pi r_{out}^2}{ab}} \right)^{1/2} \tag{11}$$

Figure 2A:
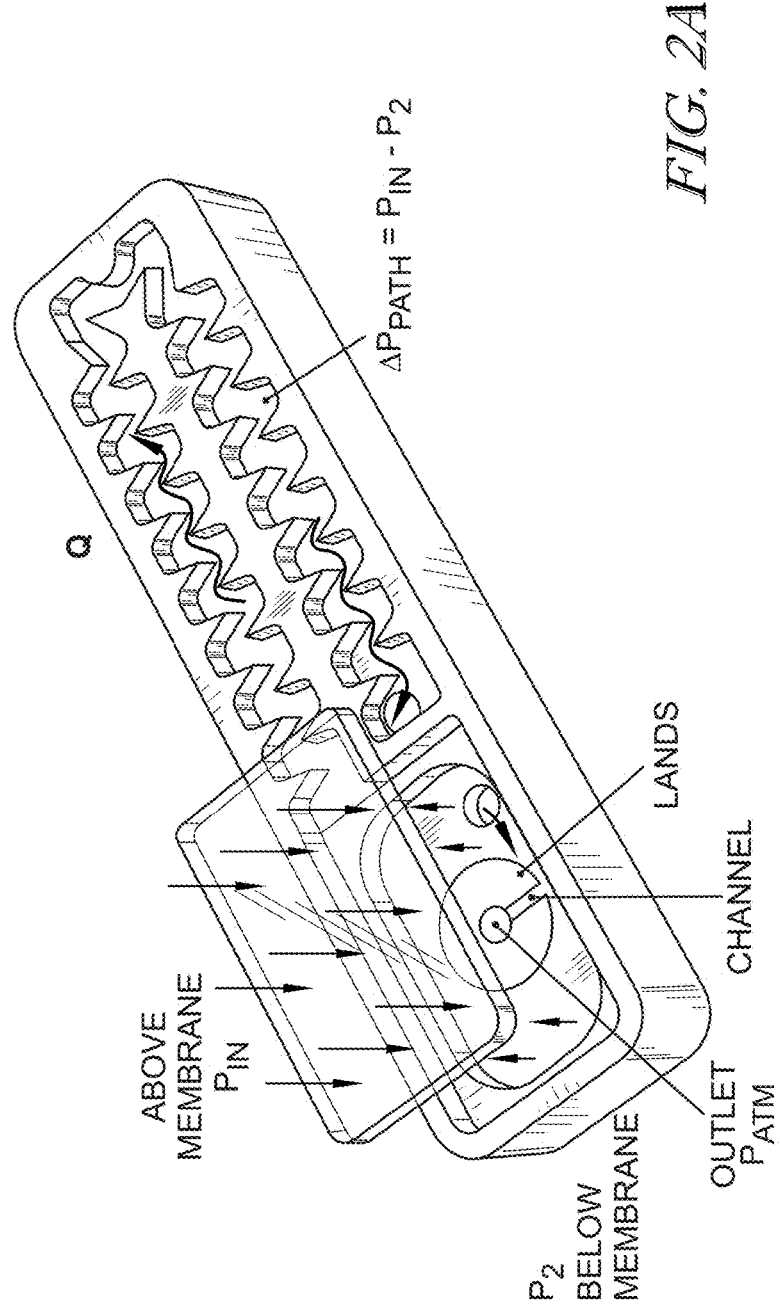
FIG. 2A is a perspective view of an exemplary embodiment of a PC drip emitter body and membrane showing pressure variables at various locations on the emitter.
Figure 2B:
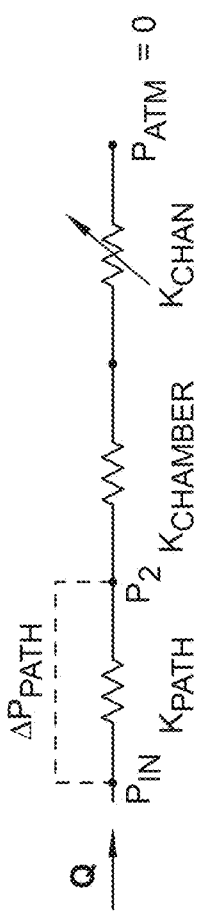
FIG. 2B is a hydraulic circuit representing flow resistances inside the PC drip emitter of FIG. 2A.

FIGS. 2A, 2B, 2C, and 2D illustrate an exemplary embodiment of a PC emitter 110 having an emitter body 120 and a membrane 150. Reviewing the illustrated PC emitter 110 helps identify the variables of Equations (10) and (11) and helps illustrates the application of the mathematical approach described herein. FIG. 2A shows that water flows through an inline PC emitter at flow rate Q, entering the emitter 110 above the membrane 150 at pressure $P_{in}$, flowing down the tortuous path 130, through a passage 138 on the bottom face (dashed arrow), entering the chamber or cavity 140 below the membrane 150 at pressure $P_2$, and exiting through the outlet 142 at $P_{at}$. FIG. 2B shows a hydraulic circuit representing flow resistances inside the dripper; the tortuous path, $K_{path}$, the membrane chamber, $K_{chamber}$, and the variable resistance in the channel, $K_{chan}$, which increases with pressure above activation to regulate the flow rate, Q.

Figure 2C:
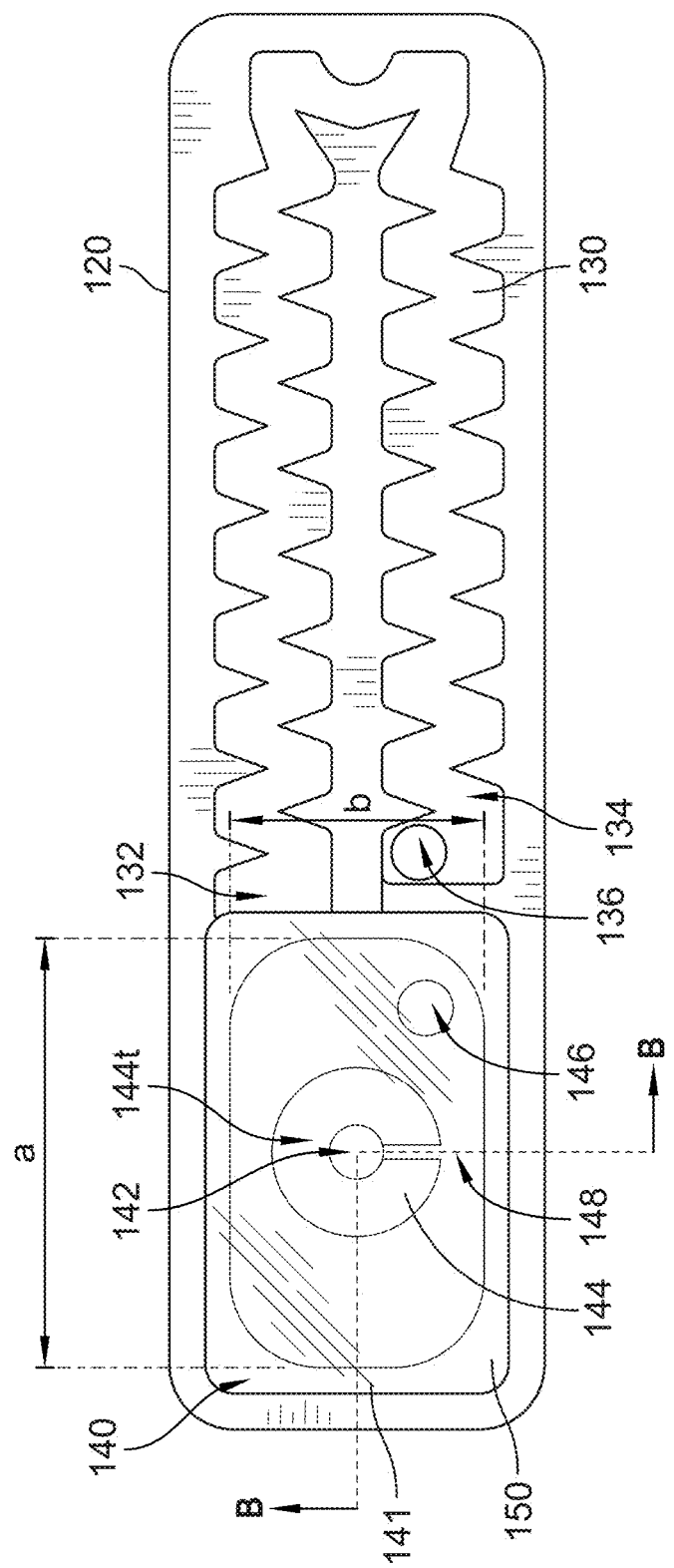
FIG. 2C is a top view of the PC drip emitter body and membrane of FIG. 2A.
Figure 2D:
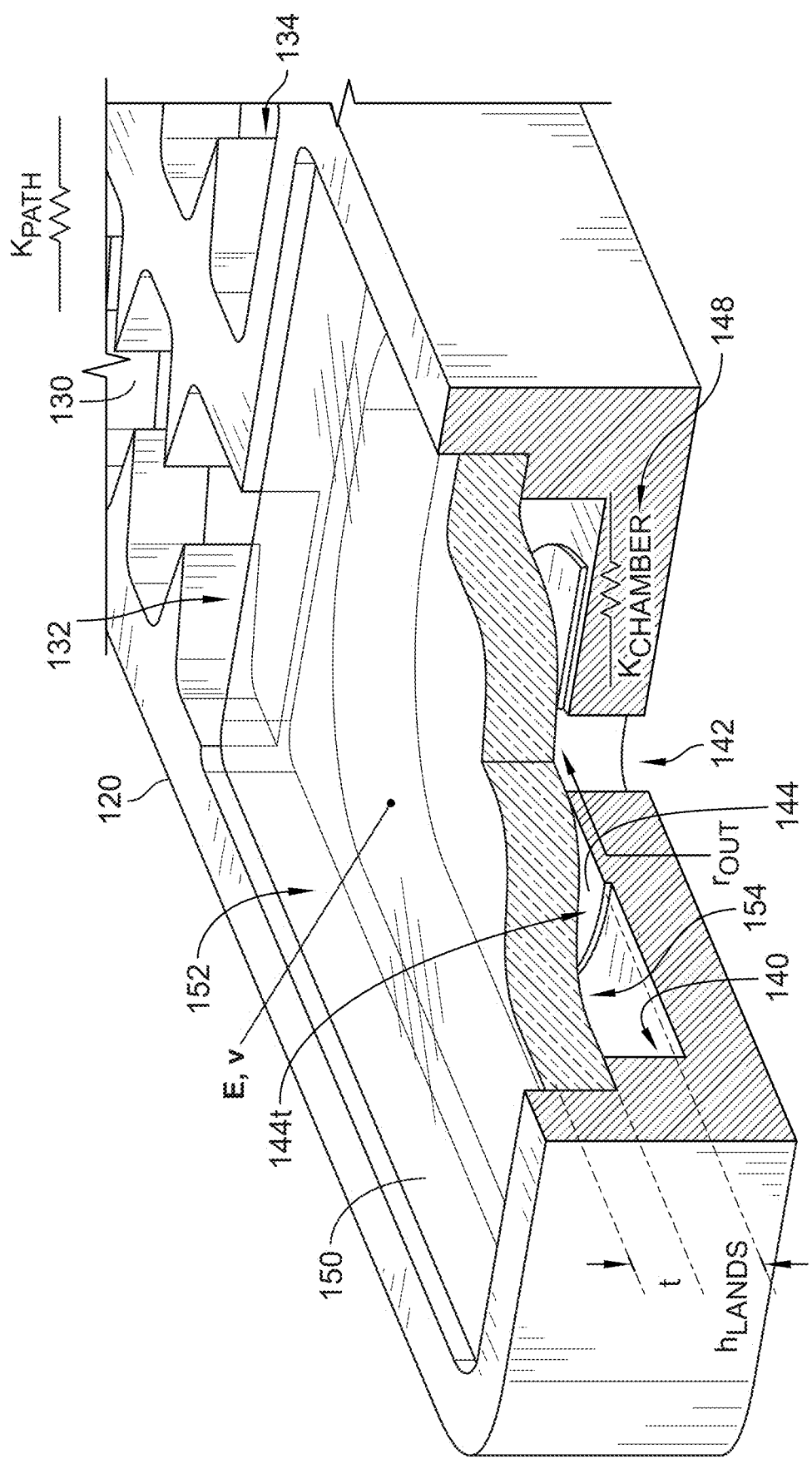
FIG. 2D is a detailed, perspective, partial cross-sectional view of the PC emitter body and membrane taken along line B-B of FIG. 2C.

As shown in FIGS. 2C and 2D, the body 120 includes formed therein a flow path 130 and a membrane cavity 140 (a cover and inlet, akin to the cover 60 and inlet 62 of FIGS. 1A-1G, can also be provided, although they are not illustrated). The flow path 130 includes a terminal entry point 132 and a terminal exit point 134, with the terminal exit point 134 including an opening 136 that is in fluid communication with the membrane cavity 140. More particularly, a fluid path (not shown) can be disposed between the opening 136 and an opening 146 in the membrane cavity 140 to allow fluid that flows through the flow path 130 to enter the cavity 140 at a lower pressure than when it entered the path 130. In the illustrated embodiment, a shape of the cavity is approximately an elliptical prism, although other shapes, such as a rectangular prism, are possible. A ledge 141 is provided upon which the membrane 150 can be disposed. The membrane 150 can be deflected towards the lands 144 as fluid flows through the path 130 and a pressure difference between top and bottom surfaces 152, 154 of the membrane 150 causes the membrane 150 to deflect. This, in turn, can cause fluid to pass through a channel 148 formed in a lands 144, allowing the fluid to pass through an outlet 142 formed in the membrane cavity 140. The outlet 142 can be part of the lands 144, or the lands 144 can include its own opening that is in fluid communication with the outlet 142.

The emitter can have two operating regimes, depending on the inlet pressure $P_{in}$. At zero inlet pressure, the emitter membrane 150 can be in its initial, undeformed state. At inlet pressures below activation pressure ($P_{in} < P_{act}$), the membrane 150 can deform without yet touching the lands 144, permitting radial flow into the outlet 142. At inlet pressure equal to activation pressure ($P_{in} = P_{act}$), the membrane 150 can deform enough to make contact with the lands 144 and cover the outlet 142, forcing all flow to exit through the channel 148. With further increases in inlet pressure ($P_{in} > P_{act}$), the flow resistance can increase as the membrane 150 covers more of the channel 148 and shears into it, enabling flow regulation.

Considering steady-state flow at a given inlet pressure, the relationship between inlet pressure, $P_{in}$, and flow rate, Q, of a PC emitter 110 in the regimes below and above activation can be represented as a circuit diagram (FIG. 2B) and expressed as Equations (1a) and (1b), with all pressures taken as gauge pressures relative to atmospheric. As will be described below, K refers to a modified pressure loss coefficient, $K = \Delta P/Q^2$ (Pa h$^2$/L$^2$), which incorporates both fluid velocity and area within the flow rate term. The flow rate is referred to in units of liters per hour (L/h), rather than the standard SI unit of m$^3$/s, following the convention used in the irrigation industry (1 L/h=2.778×10$^{-7}$ m$^3$/s).

$$P_{in} = \Delta P_{path} + P_2 = \begin{cases} Q^2(K_{path} + K_{chamber}) & \text{for } P_{in} \leq P_{act} \quad (1a) \\ Q^2(K_{path} + K_{chamber} + K_{chan}) & \text{for } P_{in} > P_{act} \quad (1b) \end{cases}$$

Here, $K_{path}$ is the pressure loss coefficient in the tortuous path 130; $K_{chamber}$ is the pressure loss coefficient below the membrane in the PC chamber or cavity 140, which can include friction losses and the orifice effect at initial contact of the membrane 150 with the lands 144; $K_{Chan}$ is the additional pressure loss coefficient through the channel 148, which is zero when the covered channel 148 length is zero (below and at activation) and an increasing function of $P_{in}$ after activation. From FIG. 2B, the pressure drop from the inlet 132 to the end 134 of the tortuous path 130 is equal to:

$$\Delta P_{path} = P_{in} - P_2 = Q^2 K_{path}, \tag{2}$$

and the gauge pressure below the membrane is:

$$P_2 = Q^2(K_{chamber} + K_{chan}), \text{ with } e_{chan} = 0 \text{ for } P_{in} \leq P_{act}. \tag{3}$$

Pressure loss coefficients in internal flows can depend, at least in part, on the geometry of the flow path and the Reynold's number Re. In most inline emitters, the tortuous path 130 is bounded by rigid walls, so its geometry is fixed, and $K_{path}$ depends solely on Re. On the other hand, the geometry of the flow path 130 through the membrane chamber or cavity 140 and channel 148 can vary with the membrane 150 deformation, which, in turn, can depend, at least in part, on the pressure difference across its thickness. Therefore, in the most general case, the pressure field in the fluid can affect the deformation of the membrane 150, and the values of $K_{chamber}$ and $K_{chan}$ can require the simultaneous solution of the coupled fluid and solid equations until convergence. However, the following sections justify several simplifications that lead to analytical, closed-form expressions for the activation pressure and flow rate for a given emitter geometry.

Two critical operating characteristics of the drip emitter-activation pressure and flow rate—can be determined using Equation 1(a) in the regime before activation, $P_{in} \leq P_{act}$. The flow resistance begins to increase significantly when the membrane 150 contacts the lands 144 and blocks off the radial flow to the outlet 142, causing the flattening of a flow rate curve. Accordingly, the activation pressure, $P_{act}$, can be defined as the minimum inlet pressure at which the membrane 150 contacts the lands 144. The activation flow rate, $Q_{act}$ is the flow rate at the activation pressure, which can be computed from Equation 1(a):

$$Q_{act} = Q(P_{act}) = \left(\frac{P_{act}}{K_{path} + K_{chamber}}\right)^{1/2} \quad (4)$$

$P_{act}$ and $Q_{act}$ can be determined by linking Equation 1(a) and Equation (4) to the 150 shape of the membrane 150 at activation. The deflection of the membrane 150, $\delta_{mem}(x,y)$, is governed, at least in part, by the fluid pressure field acting on it from above ($P_{in}$) and below ($P_2$), its geometry (e.g., length a, width b, thickness t), and material properties (e.g., Young's modulus E, Poisson's ratio v) (FIG. 2C), as will be described in greater detail below. Thus, membrane deflection at any inlet pressure $P_{in}$ can be expressed as a function of these variables, $\delta_{mem}(x, y, P_{in}, P_2, a, b, D)$, where $$D = \frac{Et^3}{12(1-v^2)}$$

is the flexural modulus, which combines material properties with the thickness, and the boundary conditions can dictate the choice of model. At $P_{in}=P_{act}$, the maximum deflection of the bottom surface of the membrane 150 at any coordinates above the lands 144 can be limited to a distance $h_{lands}$ (FIG. 2C). This constraint on membrane 150 deflection can be used with the following assumptions-supported by experiments and/or prior literature—to derive an analytical solution for $P_{act}$ and $Q_{act}$ for typical inline dripper geometries.

The first assumption is that $K_{path}$ can be nearly constant with Re in the flow rate range relevant for inline drippers, due, at least in part, to sharp corners in the tortuous path 130 that create vortices and induce turbulent behavior. Flow in tortuous paths 130 can have a lower onset of turbulence than expected from a straight channel, with transitional Re approximately in the range of about 250 to about 500. Above these values, the pressure loss coefficient typically has no dependence on Re, analogous to turbulent flow in rough channels. Because previous efforts prior to the present disclosures appear to have been based on a specific path geometry and choice of length scale for Re, the tortuous paths used in conjunction with the present disclosures was tested experimentally to validate this assumption and the applicable Re range. Experiments on five different tortuous path geometries confirm nearly constant $K_{path}$ above RE approximately in the range of about 150 to about 450, depending, at least in part, on variables such as path geometry, with the minimum plotted Re values corresponding to inlet pressures of about 5 kPa (about 0.05 bar) (FIG. 3(a)). The standard deviations of measured values were within about 10% of each mean $K_{path}$, except for the path from the 1.6 L/h commercial emitter, where the standard deviation reached about 15% of the mean. These variations are incorporated into the uncertainty of the present model, while $K_{path}$ is treated as constant at inlet pressure above about 5 kPa.

Figure 3A:
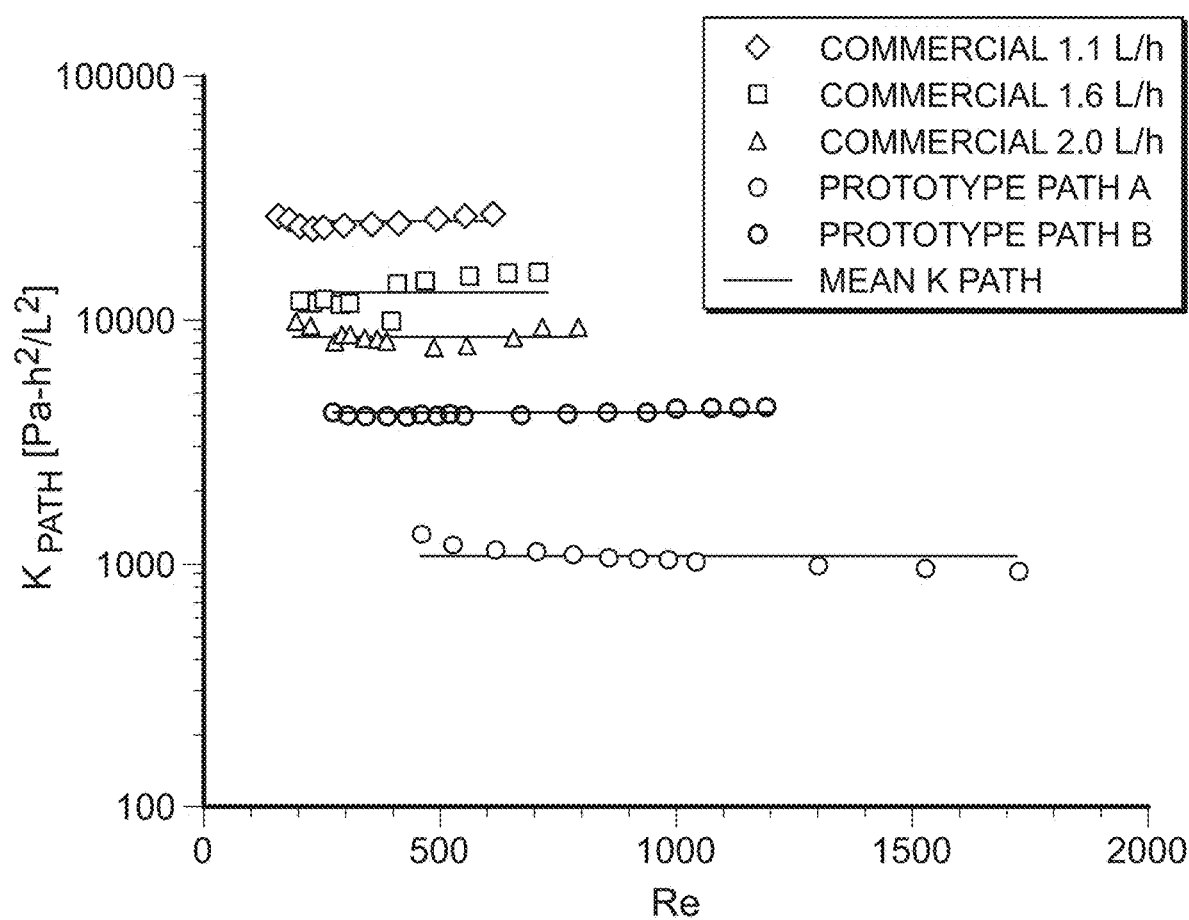
FIG. 3A is a graph that plots Reynolds number against flow resistance in the tortuous path for five different tortuous paths that may be utilized in the PC drip emitter of FIGS. 2A-2D.
Figure 3B:
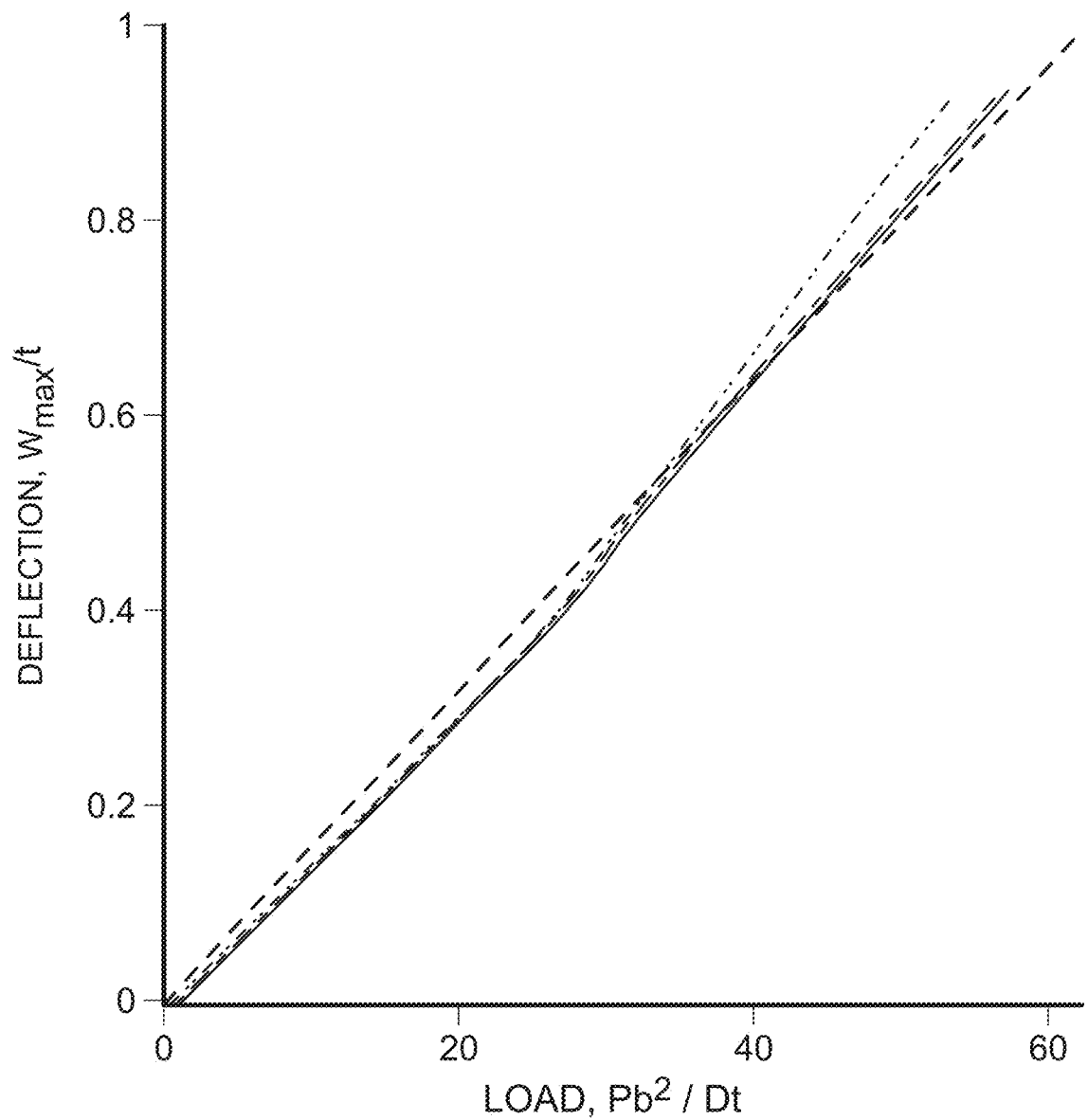
FIG. 3B is a graph that plots measured maximum membrane deflection versus a concentrated load applied at the center of the membrane of the PC drip emitter of FIGS. 2A-2D.

FIGS. 3A and 3B show experimental evidence justifying the assumptions used to derive the analytical model. FIG. 3A plots of measured $K_{path}=\Delta P/Q^2$ versus Re for five different tortuous path geometries from three commercial emitters and two machined prototypes show that $K_{path}$ can be treated as nearly constant above RE approximately in the range of about 150 to about 450, depending on geometry. The plotted ranges correspond to inlet pressures approximately in the range of about 5 kPa (about 0.05 bar) to about 150 kPa (about 1.5 bar), except for Prototype Path A, where the maximum pressure was about 50 kPa (about 0.5 bar), because higher pressures caused flow rates that exceeded the sensor range in this low-resistance path. FIG. 3B plots measured maximum membrane deflection versus a concentrated load applied at the center of the membrane. Experimental deflection for one membrane at three different loading speeds (about 0.1 mm/s, about 0.25 mm/s, and about 0.5 mm/s) is plotted in a gray solid line. As shown, the deflection is approximately linear with load. The dashed line shows the modeled deflection for this membrane using the Kirchhoff thin plate model with Young's modulus (E=2.13±0.15 MPa) fitted to experimental data for three membranes.

The second assumption is that the resistance of the membrane chamber, $K_{chamber}$, can also be treated as a constant before activation. $K_{chamber}$ comprises minor losses and friction losses in the flow between the entry to the membrane chamber and the outlet. While the bending of the membrane before activation can have some effect on $K_{chamber}$, the cross-sectional flow area below the membrane can be large enough for both the magnitude and the variation in $K_{chamber}$ to be negligible compared to the tortuous path resistance, $K_{path}$, in series with $K_{chamber}$ (FIG. 2B). Experiments show that the magnitude of $K_{chamber}$ can be below about 11% of $K_{path}$ for all commercial drippers tested (Table 1), and that $K_{chamber}$ increases to about 30% of $K_{path}$ only for a custom-made tortuous path with very low resistance. Therefore, $K_{chamber}$ can be approximated as constant to develop the analytical model of commercial emitters, but this assumption is expected to lead to greater errors for emitters with very low $K_{path}$, as discussed further below.

The third assumption is that membrane deflection can be linear with load before activation and can be modeled via superposition of multiple loads. The linearity of deflection with load can generally be valid for thin (t/L≲0.1, where t is the thickness and L is the characteristic side length) and moderately thick (0.1≲t/L ≲0.2) plates undergoing small deflection ($\delta_{max}/t≲1$). The membranes of commercial drippers utilized herein have t/L approximately in the range of about 0.13 to about 0.15 (based on average side length) and $\delta_{max}$ It approximately in the range of about 0.54 to about 0.92 at activation. As these ranges can be borderline for several criteria, flexural experiments were conducted on silicone membranes of commercial emitters to validate this assumption and choice of plate model. Collected data confirmed that linearity with load was satisfied in the expected deflection range of the membranes, and that Kirchhoff plate theory with Young's modulus E=2.13±0.15 MPa matched experimental membrane deflection in bending (FIG. 3B). Accordingly, linear thin plate theory can be suitable for modeling membrane deflection before activation.

Membrane deflection can be calculated assuming the pressure is approximately uniform with magnitude $P_1$ above the membrane 150 and at magnitude $P_2$ below it, except above the outlet 142, where the pressure is atmospheric. Thus, the net loading can be a uniform pressure $P_{in}-P_2$ over the full membrane area, plus an additional patch load over the outlet 142 with pressure $P_2$ (FIG. 2(a)). Given that the outlet 142 area, $\pi r_{out}^2$, can be small compared to the full membrane 150 area, ab ($\pi r_{out}^2$/ab<about 0.02 for all emitters utilized in the study described herein), the patch load can be approximated as a concentrated load of magnitude $P_2\pi r_{out}^2$, acting in the same direction as the membrane 150 deflection (i.e., towards the lands). Using the Navier double-series solution with simply-supported boundary conditions and the coordinate system shown in FIGS. 2C and 2D, the membrane deflection under a uniform distributed load, $\delta_{unif}$, and under a concentrated load at the center, $\delta_{conc}$, is:

$$\delta_{unif}(x, y) = \frac{16(P_{in} - P_2)}{\pi^6 D} \sum_{m=1}^{\infty} \sum_{n=1}^{\infty} \frac{\sin\left(\frac{m\pi x}{a}\right)\sin\left(\frac{n\pi y}{b}\right)}{mn\left(\frac{m^2}{a^2} + \frac{n^2}{b^2}\right)^2} \quad (5)$$

$$\delta_{conc}(x, y) = \frac{4(P_2 \pi r_{out}^2)}{\pi^4 Dab} \sum_{m=1}^{\infty} \sum_{n=1}^{\infty} \frac{\sin\left(\frac{m\pi}{2}\right)\sin\left(\frac{n\pi}{2}\right)\sin\left(\frac{m\pi x}{a}\right)\sin\left(\frac{n\pi y}{b}\right)}{\left(\frac{m^2}{a^2} + \frac{n^2}{b^2}\right)^2} \quad (6)$$

where D is the flexural modulus. The overall membrane deflection can be found through their superposition:

$$\delta_{mem}(x,y) = \delta_{unif}(x,y) + \delta_{conc}(x,y) \quad (7)$$

Combining Equation (7) with the limit on membrane 150 deflection at its first contact with the lands 144 provides a closed-form expression for $P_{act}$. The maximum membrane 150 deflection occurs at its center; therefore, its first contact with the lands 144 occurs at the outlet 142 radius, located a distance $h_{lands}$ from the undeformed membrane 150 position (FIGS. 2C and 2D). Plugging in the coordinates of an initial contact point on the outlet radius and the membrane's long axis of symmetry (FIGS. 2C and 2D), $$(x_c, y_c) = \left(\frac{a}{2} + r_{out}, \frac{b}{2}\right)$$

into Equation (7) and setting the deflection at that point equal to $h_{lands}$ at $P_{in} = P_{act}$ yields:

$$h_{lands} = \delta_{mem}\left(\frac{a}{2} + r_{out}, \frac{b}{2}\right) = \delta_{unif}\left(\frac{a}{2} + r_{out}, \frac{b}{2}\right) + \delta_{conc}\left(\frac{a}{2} + r_{out}, \frac{b}{2}\right) = \quad (8)$$

$$\frac{16(P_{act} - P_2)}{\pi^6 D} \sum_{m=1}^{\infty} \sum_{n=1}^{\infty} \frac{\sin\left(\frac{m\pi}{2} + \frac{m\pi r_{out}}{a}\right)\sin\left(\frac{n\pi}{2}\right)}{mn\left(\frac{m^2}{a^2} + \frac{n^2}{b^2}\right)^2} +$$

$$\frac{4 P_2 \pi r_{out}^2}{\pi^4 Dab} \sum_{m=1}^{\infty} \sum_{n=1}^{\infty} \frac{\sin\left(\frac{m\pi}{2}\right)\sin\left(\frac{n\pi}{2}\right)\sin\left(\frac{m\pi}{2} + \frac{m\pi r_{out}}{a}\right)\sin\left(\frac{n\pi}{2}\right)}{\left(\frac{m^2}{a^2} + \frac{n^2}{b^2}\right)^2}$$

This can be expressed more concisely by combing all terms of the infinite series (which can depend solely on the membrane side lengths and the outlet radius) and the numerical coefficients into constants $\alpha_1$ and $\alpha_2$:

$$h_{lands} = \alpha_1 \frac{P_{act} - P_2}{D} + \alpha_2 \frac{r_{out}^2}{ab} \frac{P_2}{D}. \quad (9)$$

The constants $\alpha_1$, $\alpha_2$ can be calculated by summing the full infinite series or the first few terms of each. Due to the rapid convergence of both series, summing the first nine terms can be sufficient to converge to within about 2.5% of the exact solution of Equations (10) and (11) discussed above.

Equations (10) and (11) enable the direct computation of $P_{act}$ and $Q_{act}$ with input parameters of dimensions, material properties, and resistances, all of which can be estimated or measured. The geometric inputs and material properties can be measured directly. The resistances $K_{path}$ and $K_{chamber}$ can be determined for specific geometries by experiment or through CFD simulations, depending on the level of accuracy desired. The full Q versus $P_{in}$ curve of emitter hydraulic behavior before activation can be modeled using Eq. (1(a)) up to the limit $P_{in} = P_{act}$ (Eq. (10)). This analytical model provides physical intuition on how input parameters affect PC emitter performance, which is missing in published literature, and enables quick sensitivity analyses or optimizations for desired emitter flow rates and activation pressures.

Considering the features of the PC drip emitter 110 described above with respect to Equations (10) and (11), the geometric parameters include: (1) $h_{lands}$, a distance between a top surface 144t of the lands 144 and the bottom surface 154 of the membrane 150; (2) $r_{out}$, a radius of the outlet 142; (3) a, a length of the membrane cavity 140, excluding the ledge 141; (4) b, a width of the membrane cavity 140, excluding the ledge 141; and (5) t, a thickness of the membrane 150. Other parameters of the membrane that impact activation pressure and flow rate include: (1) D, the flexural modulus of the membrane, i.e., the tendency of a material(s) forming the membrane 150 to resist bending; (2) E, which is Young's modulus, i.e., the stiffness of a material(s) forming the membrane 150; (3) ν, which is Poisson's ratio, i.e., the measurement of a material(s) forming the membrane 150 to expand or contract in directions perpendicular to a direction of loading; and (4) each of $\alpha_1$, $\alpha_2$, which are constants from deflection expressions of the membrane 150, the determinations of which are described in greater detail below.

Although detailed modeling of the regime above activation can require numerical simulation, Eq. (1(b)) for $P_{in} > P_{act}$ can be used to derive the scaling of $K_{chan}$ with pressure needed for ideal flow regulation, i.e., to maintain $Q(P_{in}) = Q_{act}$ as $P_{in}$ increases above $P_{act}$. Substituting the target constant value $Q_{act}$ into Eq. (1(b)) provides the target $K_{chan}$ as a function of $P_{in}$:

$$P_{in} = Q_{act}^2 (K_{path} + K_{chamber} + K_{chan}(P_{in})) = \quad (12)$$

$$Q_{act}^2 (K_{path} + K_{chamber}) + Q_{act}^2 K_{chan}(P_{in}) = P_{act} + Q_{act}^2 K_{chan}(P_{in}),$$

$$K_{chan}(P_{in}) = \frac{P_{in} - P_{act}}{Q_{act}^2}. \quad (13)$$

Accordingly, to maintain a constant flow rate $Q_{act}$ above activation, the flow resistance in the channel 148 increases linearly with inlet pressure and is inversely proportional to the square of the activation flow rate. Dripper designers can use this expression as a guide to refine features that affect the flow rate after activation, such as the width and depth of the channel 148 through the lands 144 (FIGS. 2C and 2D). Detailed models for fluid-structure interaction after activation can be employed in conjunction with the current analytical model to adjust the features below the membrane 150 after the main geometry has been selected.

The flexural modulus is determined by Equation 14:

$$D = \frac{Et^3}{12(1 - \nu^2)} \quad (14)$$

with E being Young's modulus, t being the thickness of the membrane, and ν being Poisson's ratio. Still further, parameters related to the body 120 that impact activation pressure and flow rate include: (1) $K_{path}$, which is a hydraulic circuit representing flow resistances along the flow path 130; and (2) $K_{chamber}$, which is a hydraulic circuit representing flow resistances in the membrane cavity 140, each of which is described in greater detail below. The values of $K_{path}$ and $K_{chamber}$ can be impacted, for example, by adjusting heights, depths, and shapes of the respective flow path 130 and membrane cavity 140, including the geometric parameters described above (e.g., $h_{lands}$, $r_{out}$, a, and b).

In view of the modeling of the present disclosure, and in particular in considering Equations (10) and (11), activation pressure can be reduced while keeping flow rate at a desired constant level can be achieved by adjusting one or more of the parameters/variables in, or otherwise impacting, the Equations. By way of non-limiting example, activation pressure can be reduced by reducing one or both of $K_{path}$ and $h_{lands}$. By way of further non-limiting example, activation pressure can be reduced by reducing one or both of $K_{path}$ and t. By way of still further non-limiting example, activation pressure can be reduced by reducing one or both of $K_{path}$ and E. By way of yet another non-limiting example, activation pressure can be reduced by reducing one or more of $K_{path}$, a, ox b.

Figure 4:
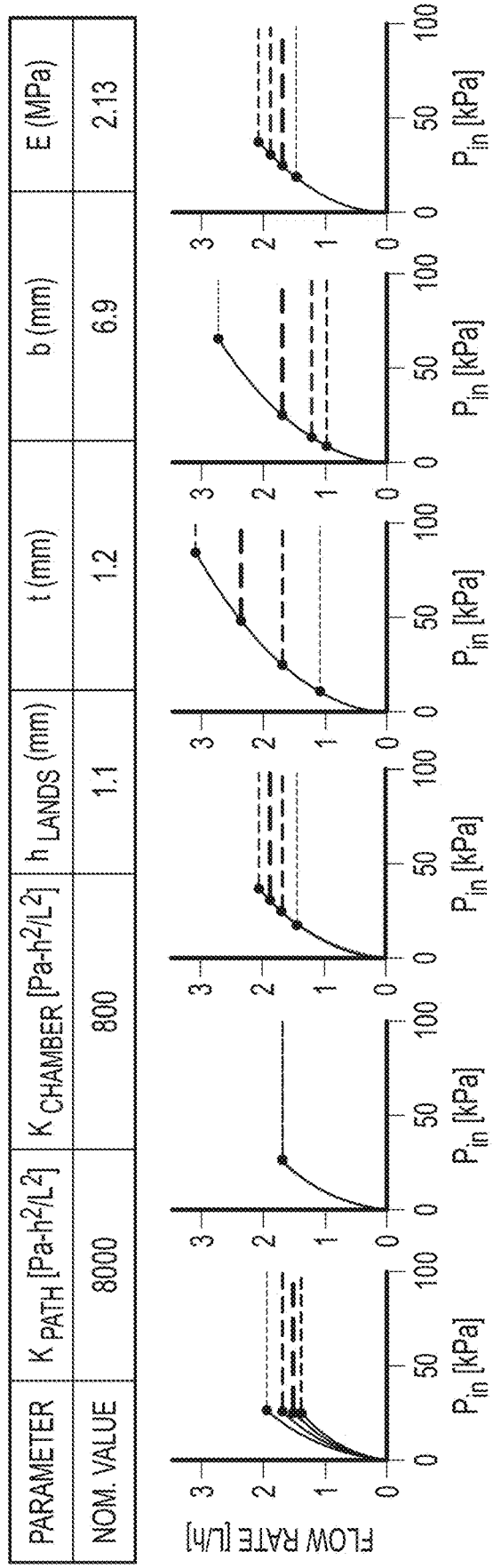
FIG. 4 is a collection of graphs that plot sensitivity of emitter activation pressure and flow rate to changes in various input parameters of the PC drip emitter of FIGS. 2A-2D.

A sensitivity analysis was run with the parametric model to illustrate the effect of input values on the activation pressure and flow rate. The parameters varied in the analysis were the resistances ($K_{path}$ and $K_{chamber}$), the distance between the membrane and the lands ($h_{lands}$), the membrane thickness (t), width (b), and Young's modulus (E) (FIG. 4). One parameter was varied at a time, with the rest kept constant at nominal values, based on typical values for inline emitters. Each parameter was sampled at four points: at 75%, 100%, 125%, and 150% of its nominal value. Other inputs were kept constant, with outlet radius $r_{out}$=0.6 mm, membrane length a=11.8 mm, and Poisson's ratio ν=0.49, typical of silicone rubber used for PC emitter membranes. Silicone rubber is one of a variety of materials that can be used for PC emitter membranes provided for herein.

The sensitivity plots (FIG. 4) compliment Equations (10) and (11) and demonstrate the dependence of activation pressure and flow rate on each parameter. The activation pressure is seen to be most sensitive to the membrane 150 thickness t. This is due, at least in part, to the fact that $P_{act}$ scales linearly with flexural modulus D, which in turn scales with $t^3$; therefore, $P_{act} \propto t^3$. The sensitivity of $P_{act}$ to the distance $h_{lands}$ is approximately linear, $P_{act} \propto h_{lands}$. The same scaling is seen between $P_{act}$ and Young's modulus E, stemming from the linearity of flexural modulus D with E: $P_{act} \propto E$. For these inputs, $Q_{act}$ scales similarly to $P_{act}$ but with reduced sensitivity, due to the power of ½ in Eq. (11):

$$Q_{act} \propto t^{\frac{3}{2}}, Q_{act} \propto h_{lands}^{\frac{1}{2}}, \text{ and } Q_{act} \propto E^{\frac{1}{2}}.$$

Hydraulic behavior is also sensitive to membrane side length b, which enters Equation (10) in the denominator as part of the constants $\alpha_1$ and $\alpha_2$. As side length increases, the membrane deflects more, resulting in earlier contact with the lands at lower $P_{act}$ and $Q_{act}$.

FIG. 4 shows modeled sensitivity of emitter activation pressure and flow rate to changes in input parameters, including flow resistances ($K_{path}$ and $K_{chamber}$), lands to membrane distance ($h_{lands}$), the membrane thickness (t), width (b), and Young's modulus (E). The activation point (Equations (10) and (11)) is marked with a circle; the curve before activation is plotted using the analytical model (Equation (1a)), while the dashed line after activation is plotted assuming ideal flow regulation (Equation (13)). One input parameter was varied at a time to values of 75%, 100%, 125%, and 150% of its nominal value, with the lightest line corresponding to the minimum and the darkest corresponding to the maximum parameter value. Activation pressure and flow rate are most sensitive to the membrane thickness, due to its cubic scaling in the flexural modulus D.

The sensitivity of $P_{act}$ to $K_{path}$ and $K_{chamber}$ is low, as a change in one affects both the numerator and denominator in Equation (10). Conversely, $Q_{act}$ is much more sensitive to $K_{path}$ than to $K_{chamber}$, as the term multiplied by $K_{chamber}$ in the denominator of Equation (11) is nearly negligible compared to the term multiplied by $K_{path}$, due to the very low ratio of areas of the outlet and the membrane.

A prototyping method for inline PC emitters was developed to facilitate model validation and testing of new designs, as the commercial emitter manufacturing process is too inflexible to be used effectively in the design stage. Inline PC emitters can be manufactured by injection molding the plastic body and cover of the emitter. After molding, the two parts can be ultrasonically welded with a membrane between them, sealing the emitter. Finally, the assembled emitter can be heat-welded inside the lateral tube as the tube is extruded. As this process requires significant time and equipment, a simplified prototyping method using CNC milling was developed and verified to ensure its ability to replicate the geometry and hydraulic performance of a commercial injection-molded dripper.

Figure 5A:
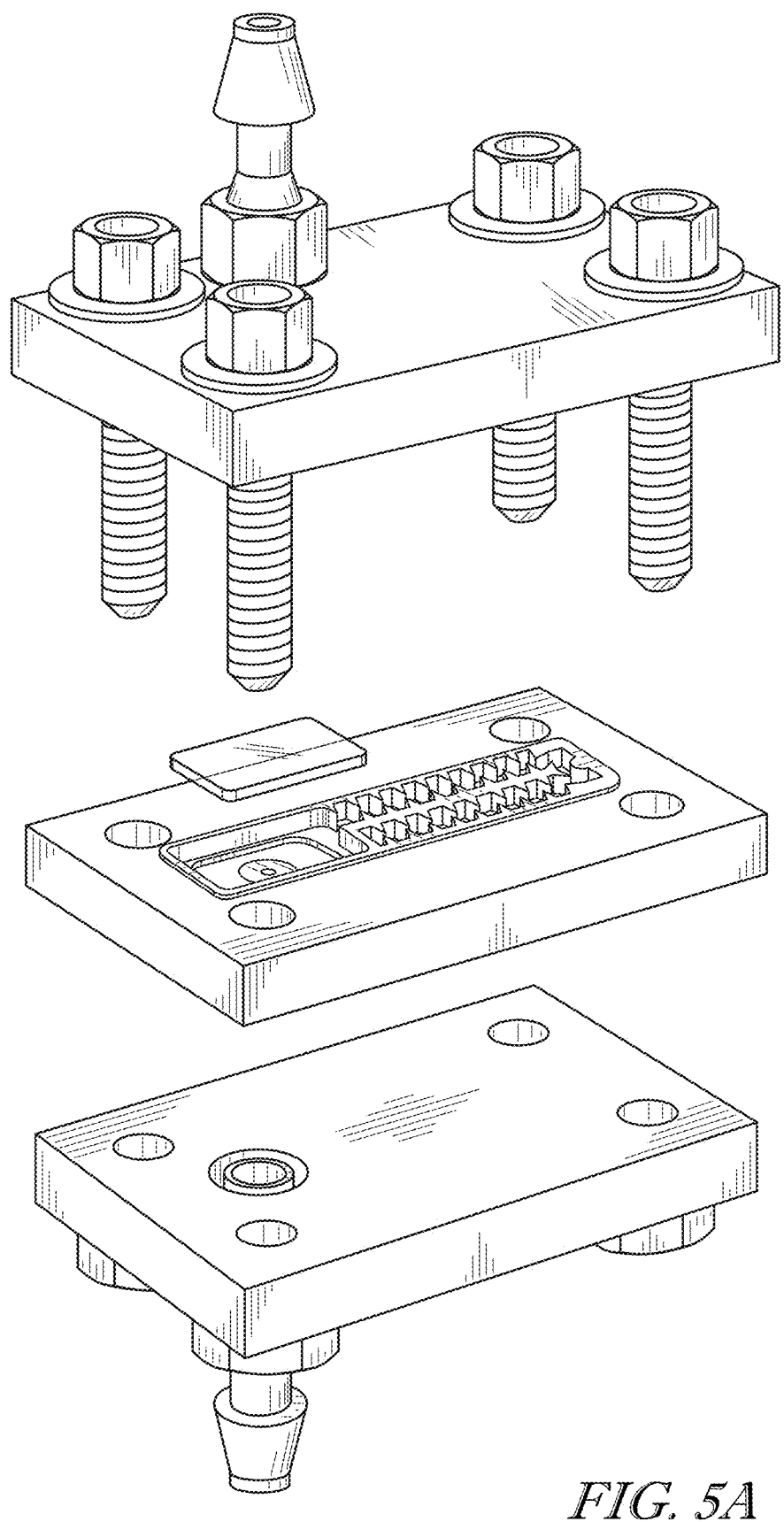
FIG. 5A is an exploded view of a prototype assembly of a PC drip emitter according to the present disclosure.

The prototyping setup comprises three rectangular aluminum plates held together by screws at four corners (FIG. 5A). The geometry of the emitter cover was CNC machined into the top plate, with the inlet threaded for attaching a tubing fixture. The geometry of the emitter body was machined into the middle plate, with the tortuous path and membrane chamber on the top face, and the passage conveying water from the tortuous path to the membrane chamber on the bottom face. The bottom plate was used as the cover for this passage (in commercial emitters, this passage is often covered by the lateral tube welded to the emitter bottom face). Aluminum 6061 was used as the prototype material to maintain tight tolerances during the milling process.

Figure 5B:
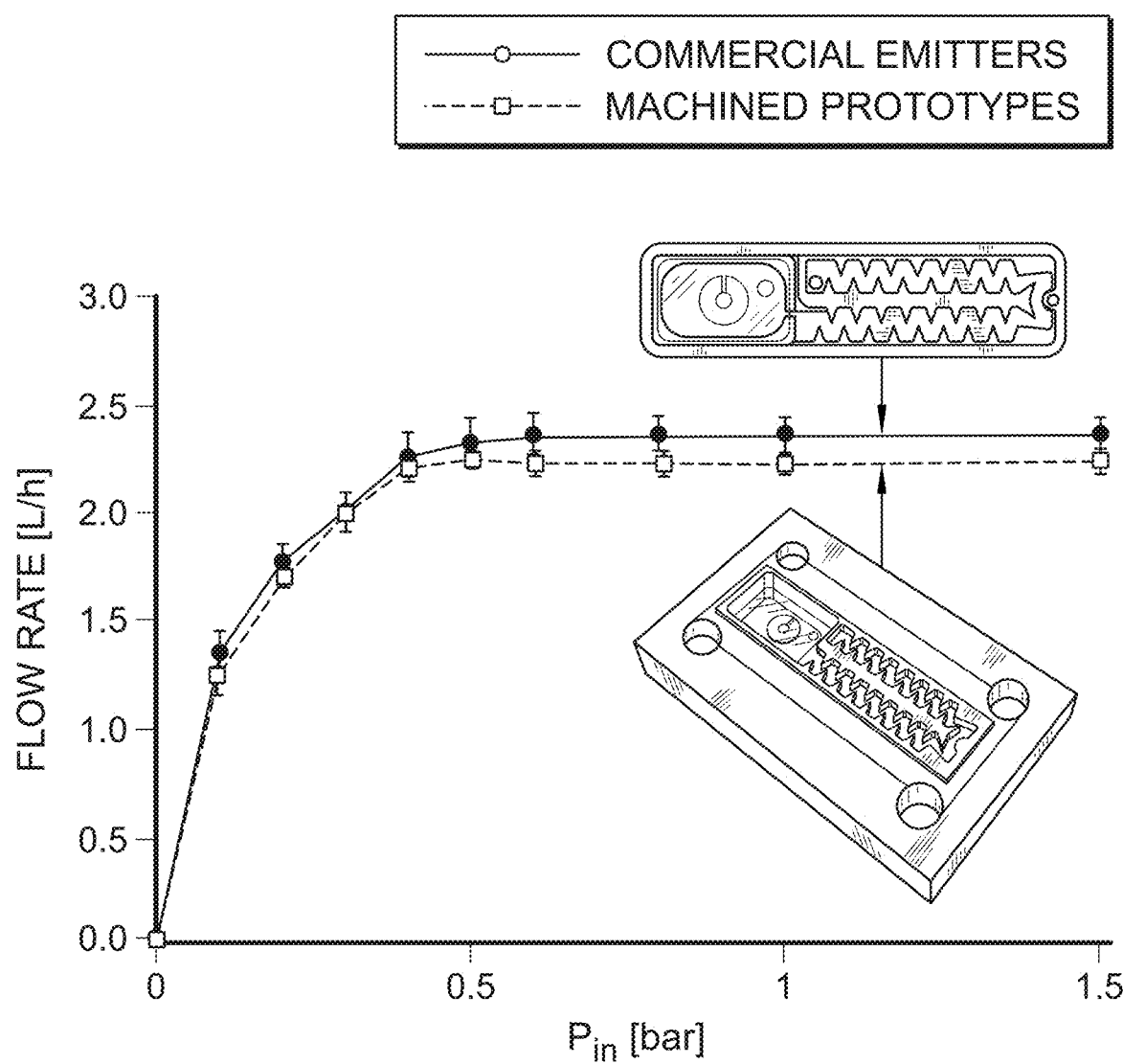
FIG. 5B is a graph that plots flow rate versus inlet pressure for the PC drip emitter prototype shown in FIG. 5A.

FIGS. 1A and 5B show an inline emitter prototyping method used for model validation and design testing. FIG. 5A shows an exploded view of the prototype assembly. Three aluminum plates are held together by screws at the corners, with internal emitter features machined in the top and middle plates. The membrane is placed on its seat in the middle plate. FIG. 5B is a graph that plots flow rate versus inlet pressure for the prototype replicating the 2 L/h Turbo-Cascade PC emitter (Jain Irrigation, Ltd.), plotted as the average and standard deviation measured from two prototype duplicates. The prototypes demonstrate a close fit to the measured flow rates of commercial injection-molded emitters, plotted as the average and standard deviation measured from 12 emitters. Photographs of the commercial and prototype emitter bodies appear in the inset.

To avoid leaks, the body geometry can be embossed, creating a narrow ridge around the perimeter that concentrated the clamping force from the screws onto a small area and forming a seal around the flow path. For all prototype tests, screws were tightened to a consistent torque of about 3.4 N-m, experimentally determined to prevent leaking at all pressures while minimizing any sensitivity to the clamping force. Gaskets were not used for sealing between aluminum plates, as their low stiffness created difficulty in maintaining consistent flow path dimensions, especially in the tortuous path. The flow rate through an emitter can be highly sensitive to changes in the tortuous path cross-section, which affect $K_{path}$, as evidenced by the sensitivity analysis (FIG. 4).

This method was validated by replicating flow-pressure behavior of a commercial inline PC emitter in a prototype matching the geometric features of the commercial emitter. A 2 L/h emitter manufactured by Jain Irrigation, Ltd. was chosen for the comparison. Two duplicate prototypes were machined with geometric features identical to those of the injection-molded commercial dripper (within about ±0.03 mm), and the hydraulic performance of each prototype was tested twice using membranes from the commercial drippers. Duplicate test results were averaged. This comparison demonstrated good agreement between the flow-pressure curve of the prototype and commercial emitters (FIG. 5B) with a maximum error of about 8% at a pressure of about 10 kPa (about 0.1 bar), and an average error of about 5% in the regulated flow rate (estimated as the mean of all flow rates above about 50 kPa (about 0.5 bar)). The close match between prototypes and injection-molded drippers suggests that prototypes of new designs would perform similarly when converted to injection molded commercial products, mitigating risk in the design process.

To test the pressure-flow behavior of commercial and prototype emitters, a tank containing compressed air and water was connected via flexible ⅜" ID tubing to an air release valve, a 20-micron filter, a programmable pressure regulator and flow sensor (Alicat LC-100CCM-D, ±3 kPa for pressure, ±0.12 L/h for flow rate), an additional pressure gauge for verification (ProSense DPG1-100, ±3 kPa), and either an emitter prototype assembly (FIG. 5A) or a piece of tubing with a bonded commercial emitter. The pressure regulator was connected to a computer and programmed to cycle through a range of pressure setpoints, starting at 5 kPa (0.05 bar), stepping from 10 to 100 kPa (0.1 bar to 1.0 bar) at intervals of 10 kPa (0.1 bar), and ending at 150 kPa (1.5 bar). The pressure was stepped both up and down during each test in order to note any hysteresis. Before each test, the emitter was primed by cycling twice between maximum and minimum pressures. Pressure was maintained for about 60 seconds at each setpoint, with pressure and flow rate recorded to a file every second. These time series were subsequently processed into flow rate versus pressure curves as follows: for each pressure setpoint, readings before pressure had equilibrated to about ±1% of the setpoint were filtered out, and the mean of the remaining values was taken as the flow rate for the dripper at that pressure.

The proposed model was validated by comparing the activation pressure and flow rate it predicted to measurements from six emitter models: three commercial emitters and three custom prototypes. The commercial emitters were TurboCascade PC 1.1 L/h, 1.6 L/h, and 2.0 L/h models from Jain Irrigation, Ltd. Three custom prototypes were fabricated to capture further geometrical variations not seen in these commercial drippers. The prototypes varied from the commercial emitters in their tortuous path geometry (prototypes 1 and 2 use tortuous path A; prototype 3 uses tortuous path B), the height of the membrane above the lands, and the dimensions of the channel and lands. The prototypes were constrained to using available commercial emitter membranes in two thicknesses (about 1.2 mm and about 1.4 mm), with other membrane parameters kept constant.

The commercial emitters were disassembled and their dimensions were measured using a dial indicator (Mitutoyo 2416S, ±0.01 mm) for vertical dimensions and a digital microscope (AmScope H800-DAB-96S-HD1080) for horizontal dimensions. Three samples of each commercial emitter were measured and averaged. The dimensions of the prototypes were measured using the same procedure, with one sample of each. Membrane thickness was measured with a test indicator mounted on a height gauge (Machine DRO ME-HG-PRO-500, about ±0.05 mm), ensuring minimal load from the measuring tip so as not to compress the silicone membrane during measurement, for three samples of each thickness. All dimensions were recorded as averages with uncertainty estimated as the maximum of the measured standard deviation or the accuracy of the measuring tool. The dimensions of the features below the membrane—the channel height, width, and length—were recorded for replicability (Table 1) but not used in the analytical model, as the model does not predict behavior after activation.

The resistances of the tortuous path ($K_{path}$) and membrane chamber ($K_{chamber}$) were measured experimentally. For the two tortuous path geometries used in custom prototypes (FIG. 3A), the tortuous paths were machined in isolation and tested analogously to full emitter prototypes. For commercial emitters bonded inside lateral tubes, the tortuous path resistance was measured by manually adding an extra outlet in the tube directly after the end of the tortuous path, where water could exit before entering the membrane chamber; this isolated the measured resistance from any effects of membrane deformation, allowing it to be attributed primarily to the tortuous path. For all commercial and prototype emitters, $K_{chamber}$ was estimated as the difference between the total measured emitter resistance at activation pressure and its measured tortuous path resistance. In the absence of physical prototypes, these resistances can be estimated with computational fluid dynamics (CFD) simulation, with care taken to calibrate the CFD model to ensure its accuracy.

The hydraulic behavior before activation for each emitter was compared to the behavior modeled using the emitter's geometric properties and resistances as inputs. The goodness of fit was assessed by comparing the modeled $P_{act}$ and $Q_{act}$ (Equations (10) and (11)) to measured values. For the experimental measurements, $P_{act}$ was estimated as the minimum pressure at which the measured flow rate was within about ±5% of $Q_{act}$, while $Q_{act}$ was calculated as the mean of all flow rates measured at and above $P_{act}$ for that emitter. The resolution of the measured $P_{act}$ was limited by the values of the pressure setpoints used in the experiments (at intervals of every 10 kPa (0.1 bar)), and thus could not be as precise as the values calculated by the model. This may affect some of the errors seen in the results, and is described further below.

TABLE 1

Geometric and material properties of commercial and prototype emitters used for model validation

| Parameter | Unit | Commercial emitters | | | Prototype emitters | | |
|---|---|---|---|---|---|---|---|
| | | 1.1 L/h | 1.6 L/h | 2.0 L/h | 1 | 2 | 3 |
| $K_{path}$ | Pa-h$^2$/L$^2$ | 25580 ± 1398 | 12913 ± 1880 | 8445 ± 532 | 1075 ± 112 | 1075 ± 112 | 4138 ± 97 |
| $K_{chamber}$ | Pa-h$^2$/L$^2$ | 476 ± 26 | 1446 ± 211 | 87 ± 6 | 374 ± 65 | 331 ± 42 | 584 ± 142 |
| $h_{lands}$ | mm | 1.01 ± 0.02 | 1.07 ± 0.01 | 1.15 ± 0.01 | 1.12 ± 0.01 | 0.65 ± 0.01 | 0.66 ± 0.01 |
| $r_{out}$ | mm | 0.47 ± 0.02 | 0.56 ± 0.01 | 0.63 ± 0.01 | 0.60 ± 0.01 | 0.60 ± 0.01 | 0.60 ± 0.01 |
| t | mm | 1.40 ± 0.01 | 1.40 ± 0.01 | 1.40 ± 0.01 | 1.20 ± 0.01 | 1.20 ± 0.01 | 1.20 ± 0.01 |
| a | mm | 11.76 ± 0.02 | 11.79 ± 0.05 | 11.79 ± 0.04 | 11.60 ± 0.01 | 11.60 ± 0.01 | 11.60 ± 0.01 |
| b | mm | 6.88 ± 0.03 | 6.90 ± 0.03 | 6.90 ± 0.01 | 6.80 ± 0.01 | 6.80 ± 0.01 | 6.80 ± 0.01 |
| E | MPa | 2.13 ± 0.15 | | | | | |
| v | — | 0.49 ± 0.01 | | | | | |
| $w_{chan}$ | mm | 0.43 ± 0.01 | 0.49 ± 0.02 | 0.49 ± 0.01 | 0.70 ± 0.01 | 0.70 ± 0.01 | 0.70 ± 0.01 |
| $h_{chan}$ | mm | 0.04 ± 0.01 | 0.07 ± 0.01 | 0.09 ± 0.01 | 0.10 ± 0.01 | 0.08 ± 0.01 | 0.08 ± 0.01 |
| $L_{chan}$ | mm | 2.00 ± 0.01 | 1.92 ± 0.02 | 1.84 ± 0.01 | 1.78 ± 0.01 | 1.78 ± 0.01 | 1.78 ± 0.01 |

Figure 6:
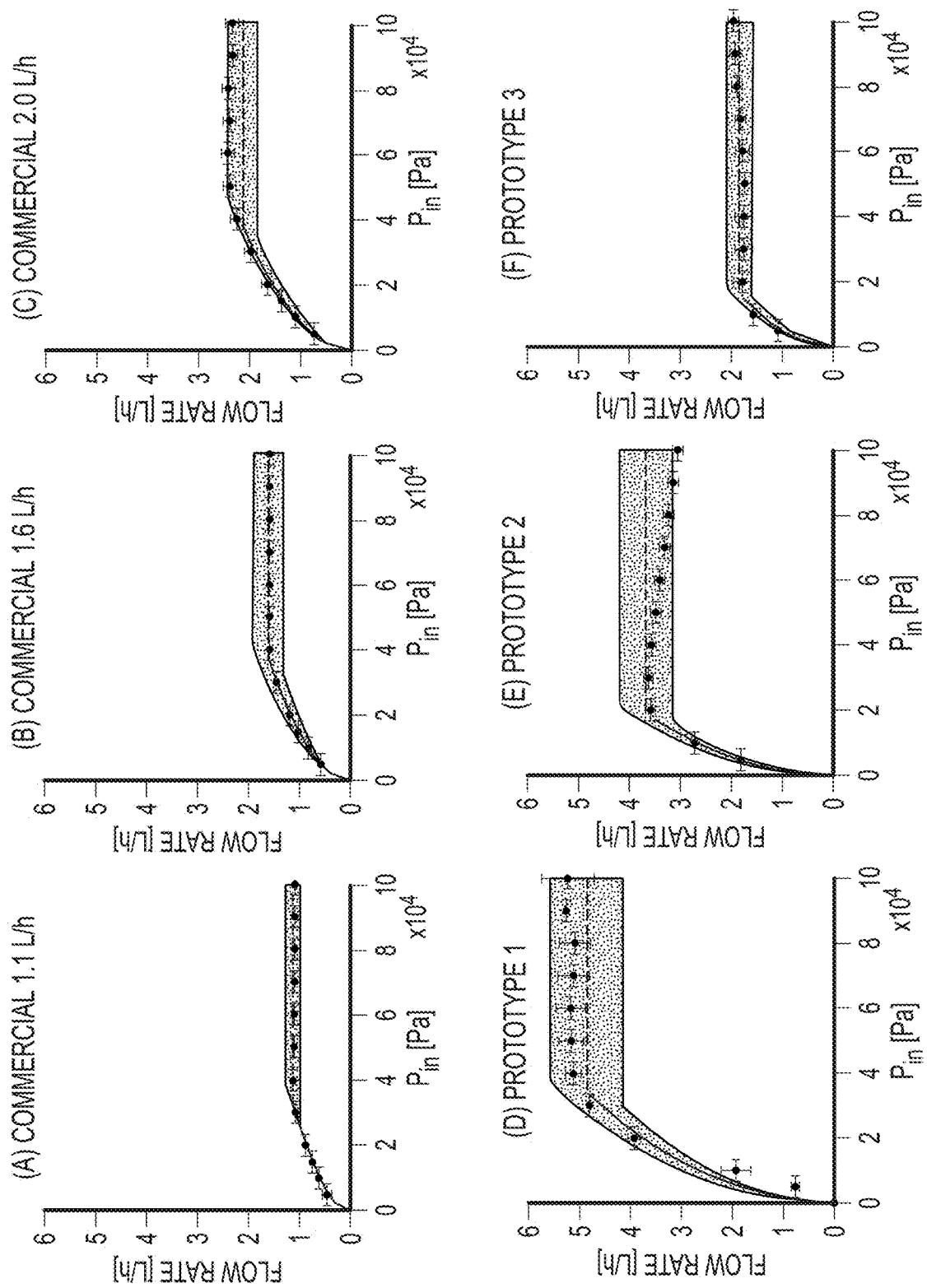
FIG. 6 is a collection of graphs showing observed behavior for emitters commercially produced (a-c) and prototyped (d-f) to the analytical model of behavior before activation, the dots representing measured values with measurement uncertainties, the solid lines representing the modeled values below activation, and the dashed lines showing hypothetical ideal compensating behavior after activation.

The model shows good agreement to experimental performance of three commercial emitters and three prototypes (Table 2, FIG. 6). Error bars representing the uncertainty in flow rate are based on standard deviations from all measurements for that commercial emitter or prototype, and the pressure error bars are based on sensor accuracy, as the measured standard deviation was approximately zero in all cases. Due to the sensitivity of the model to input parameters, uncertainty ranges for the model are also shown in the plots as shaded regions (FIG. 6). To calculate these ranges, four inputs were considered to have the highest uncertainty/ manufacturing variation: membrane thickness t and Young's modulus E, both of which depend, at least in part, on the silicone manufacturing process, and path and chamber resistances, both of which are expected to deviate slightly from their average values (e.g., as seen in FIG. 3A). The uncertainty of these inputs was estimated as follows: membrane thickness uncertainty of about ±0.01 mm is based on standard deviations of the measurements; Young's modulus uncertainty of about ±0.15 MPa is based on standard deviations from experimental measurements of membrane deflection; $K_{path}$ and $K_{chamber}$ uncertainties are taken from the hydraulic measurements of each emitter (Table 2). Uncertainties in the remaining inputs were deemed negligible in comparison and are not included in the shaded range.

eled values below activation, and dashed lines show hypothetical ideal compensating behavior after activation (not all prototypes achieve ideal compensation, as they were not specifically designed for it). The shaded region indicates the potential range predicted by the model considering input uncertainties.

In all cases, the activation pressure was predicted within about 15% of the measured value, and the activation flow rate within about 8.8%, using the base model inputs. The largest absolute error in activation pressure was about 6 kPa (about 0.06 bar), and the maximum absolute error in flow rate was about 0.33 L/h, for the emitter with the highest flow rate. The most likely sources of error include manufacturing variation in the inputs mentioned above. When uncertainty in those inputs is considered, the modeled activation ranges encompass all measured values. Another source of error is the low resolution of experimental pressure measurements, which were taken at intervals of about 10 kPa (0.1 bar), leading to an estimated uncertainty of about 5 kPa in the measured $P_{act}$, and corresponding to relative uncertainty approximately in the range of about 12% to about 33%. Smaller intervals between pressure setpoints (e.g., approximately in the range of about 1 kPa to about 2 kPa) would provide more precision in measured $P_{act}$ values and in the error estimate.

TABLE 2

Comparison of measured and modeled activation pressures and flow rates for three commercial emitters and three prototypes

| Value | Units | Commercial Emitters | | | Custom prototypes | | |
|---|---|---|---|---|---|---|---|
| | | 1.1 L/h | 1.6 L/h | 2.0 L/h | 1 | 2 | 3 |
| Measured $P_{act}$ | kPa | 30 ± 5 | 40 ± 5 | 40 ± 5 | 40 ± 5 | 20 ± 5 | 15 ± 5 |
| Measured $Q_{act}$ | L/h | 1.10 ± 0.02 | 1.60 ± 0.01 | 2.34 ± 0.07 | 5.20 ± 0.26 | 3.64 ± 0.04 | 1.87 ± 0.11 |
| Modeled $P_{act}$ | kPa | 34 ± 8 | 38 ± 10 | 39 ± 9 | 34 ± 9 | 19 ± 4 | 17 ± 5 |
| Modeled $Q_{act}$ | L/h | 1.14 ± 0.13 | 1.63 ± 0.21 | 2.14 ± 0.23 | 4.87 ± 0.54 | 3.71 ± 0.41 | 1.87 ± 0.20 |
| Abs error, $P_{act}$ | kPa | −4 | 2 | 1 | 6 | 1 | −2 |
| Abs error, $Q_{act}$ | L/h | −0.04 | −0.03 | 0.21 | 0.33 | −0.07 | 0.0 |
| Rel error, $P_{act}$ | % | −13.3% | 5.0% | 2.5% | 15.0% | 5.0% | −13.3% |
| Rel error, $Q_{act}$ | % | −4.1% | −1.9% | 8.8% | 6.3% | −2.0% | −0.1% |

FIG. 6 shows a comparison of observed behavior for emitters commercially produced by Jain Irrigation, Ltd. (a-c) and prototyped in the lab (d-f) to the analytical model of behavior before activation. Geometric parameters for each emitter are listed in Table 1, and measured performance is quantified in Table 2. Dots represent measured values with measurement uncertainties, solid lines represent the mod- Assumptions used in model derivation may account for some of the discrepancies. For cases (c) and (d), the base model under-predicts the activation flow rate and pressure. This may be due, at least in part, to a departure from linearity for membrane deflection in the higher deflection range, as these two emitters have the largest distance to the lands and, as a result, the largest extent of membrane deformation. The assumption of constant $K_{chamber}$ is expected to lead to greatest errors for emitters with low $K_{path}$, such as (d)-(f), where $K_{chamber}$ approaches the same order of magnitude as $K_{path}$. Finally, the assumption of constant $K_{path}$ will typically be invalid in the lowest flow rate and pressure ranges, when flow in the tortuous path becomes more laminar and its dependence on Re becomes more pronounced.

Overall, the model is flexible enough to predict the emitter activation point for a range of geometries, with flow rates being approximately in the range of about 1 L/h to about 5 L/h and activation pressures approximately in the range of about 15 kPa to about 40 kPa (about 0.15 bar to about 0.4 bar).

The model and prototyping method were applied to the design of a low-activation-pressure emitter, using the commercial design with 2 L/h nominal flow rate and $P_{act}$ of 0.4 bar as the basis. A systematic dripper redesign process for lowering activation pressure at this flow rate under a set of constraints is presented below. The dimensions and material properties of the membranes from the commercial emitters (a, b, t, E, ν) (Table 1) were kept constant due to manufacturing constraints (the commercial emitter membranes are injection molded for Jain Irrigation, Ltd., in one standard size). Therefore, the parameters that were allowed to vary were $h_{lands}$, $K_{path}$, and $K_{chamber}$.

Sensitivity analysis (FIG. 4) indicates that reducing $h_{lands}$ and $K_{path}$ would be most effective in reducing activation pressure. A reduction in $K_{path}$ makes the initial flow rate versus pressure curve before activation steeper, and a simultaneous reduction in $h_{lands}$ forces that curve to level off at a lower activation pressure. Therefore, the redesign required lowering $K_{path}$ of the commercial 2 L/h emitter ($K_{path,comm\ 2\ L/h}$=8445±532 Pa h$^2$/L$^2$) and determining the corresponding change in $h_{lands}$ needed to maintain the original flow rate. Two prototype tortuous paths, which had been characterized previously as having lower path resistances than $K_{path,comm\ 2\ L/h}$, were considered for use in the redesigned emitter (FIG. 3(a), Table 1): $K_{path,A}$=1075±112 Pa h$^2$/L$^2$ (used in Prototype 2) and $K_{path,B}$=4138±97 Pa h$^2$/L$^2$ (used in Prototype 3). The geometry of the channel ($w_{chan}$, $h_{chan}$, $L_{chan}$), lands, and outlet radius $r_{out}$) from these prototypes were kept constant, with $K_{chamber}$ assumed to remain the same as in the tested prototypes (Table 1).

The values of the parameters retained from the original commercial emitter (a, b, t, E, ν) and the two pairs of resistance values under consideration were entered into the model (Equations (10) and (11)) to determine the distance $h_{lands}$ that would provide the target flow rate of 2.3 L/h (the average flow rate measured for the commercial emitter), and compute the corresponding activation pressure for the two potential redesigns. For the design with $K_{path,A}$1075±112 Pa h$^2$/L$^2$ and $K_{chamber,A}$=331±42 Pa h$^2$/L$^2$, the lands distance required for the target flow rate was calculated as $h_{lands,A}$=0.17 mm, with a predicted activation pressure $P_{act,A}$=8 kPa (0.08 bar). For the design with $K_{path,B}$=4138±97 and $K_{chamber,B}$=584±142, the required $h_{lands,B}$ was 0.66 mm, with activation pressure $P_{act,B}$=23 kPa (0.23 bar).

The latter design with $h_{lands,B}$=0.66 mm was selected for further prototyping and testing, as the smaller $h_{lands,A}$=0.17 mm required for the alternative design was deemed impractical for a commercial product (although the present disclosure does not rule out that such a configuration may be possible). In a commercial drip emitter, such a small gap between the membrane and lands could cause several complications. For example, it could increase the sensitivity of emitter flow rate to manufacturing variation and the emitter's clogging tendency. The first consideration can be explained via Equations (10) and (11): a variation in $h_{lands}$ of about ±0.02 mm-which can be expected for injection-molded commercial emitters (Table 1)—would be about 11.8% of the nominal gap size of 0.17 mm and lead to a variation of about ±6.1% in $Q_{act}$; in contrast, the same absolute variation in $h_{lands}$ would only be about 3.0% of the larger 0.66 mm gap, corresponding to a variation of about ±1.5% in $Q_{act}$. The second consideration is based on the fact that suspended particles in irrigation water that pass through the filtration system could get trapped below the membrane, affecting the emitter flow rate. Common filter mesh sizes recommended for use in drip irrigation can be approximately in the range of about 100 microns to about 200 microns, which is comparable in magnitude to the gap of 0.17 mm (170 microns), increasing the risk of particles getting trapped. In contrast, larger $h_{lands}$ can allow a trapped particle to be flushed out when the membrane returns to its undeformed position. These reasons contributed to the result that the redesigned emitter uses $h_{lands,B}$ and the corresponding $K_{path,B}$.

To create a tortuous path with a target resistance, emitter designers can rely on a systematic modification of a previously-characterized tortuous path with a known resistance. A standard tortuous path can be composed of identical repeating units along its length (FIG. 2A) (although, alternatively, such units do not have to be repeated identically along the path length, as other designs are possible and the present systems and methods disclosed may be adapted for such configurations); a fluid in steady, hydrodynamically fully-developed flow should attain the same velocity field and pressure drop across each unit. Therefore, $K_{path}$ can be adjusted by proportionally scaling the number of repeating units. This procedure was used for the low-pressure redesign. The tortuous path of the commercial 2 L/h emitter was verified by CFD simulation to have approximately linear pressure drop with each repeating unit, except in the developing flow regions at the start of the path and after the U-turn. It was adapted for the low-pressure design by reducing the number of units from 16 to 6. With all other dimensions kept constant, this change was expected to result in a resistance of about 6/16 of $K_{path,comm\ 2\ L/h}$, or about 3167±200 Pa h$^2$/L$^2$. After the path was fabricated by CNC machining, its resistance was measured to be $K_{path,B}$=4138±97 Pa h$^2$/L$^2$. The difference between the expected and measured resistances can be traced to the assumption of neglecting the pressure drop in the developing flow regions, and to machining tolerances, which resulted in some dimensional deviations from the design, particularly in the gap between teeth (the machined gap was about 0.05 mm smaller than the commercial path's gap of about 0.10 mm, which increased the flow resistance). The principle of linearity of path resistance with number of units can be used for initial design of tortuous paths with a target resistance; nevertheless, experimental validation of $K_{path,B}$ after fabrication of a prototype is recommended, due to its sensitivity to manufacturing variation.

Figure 7:
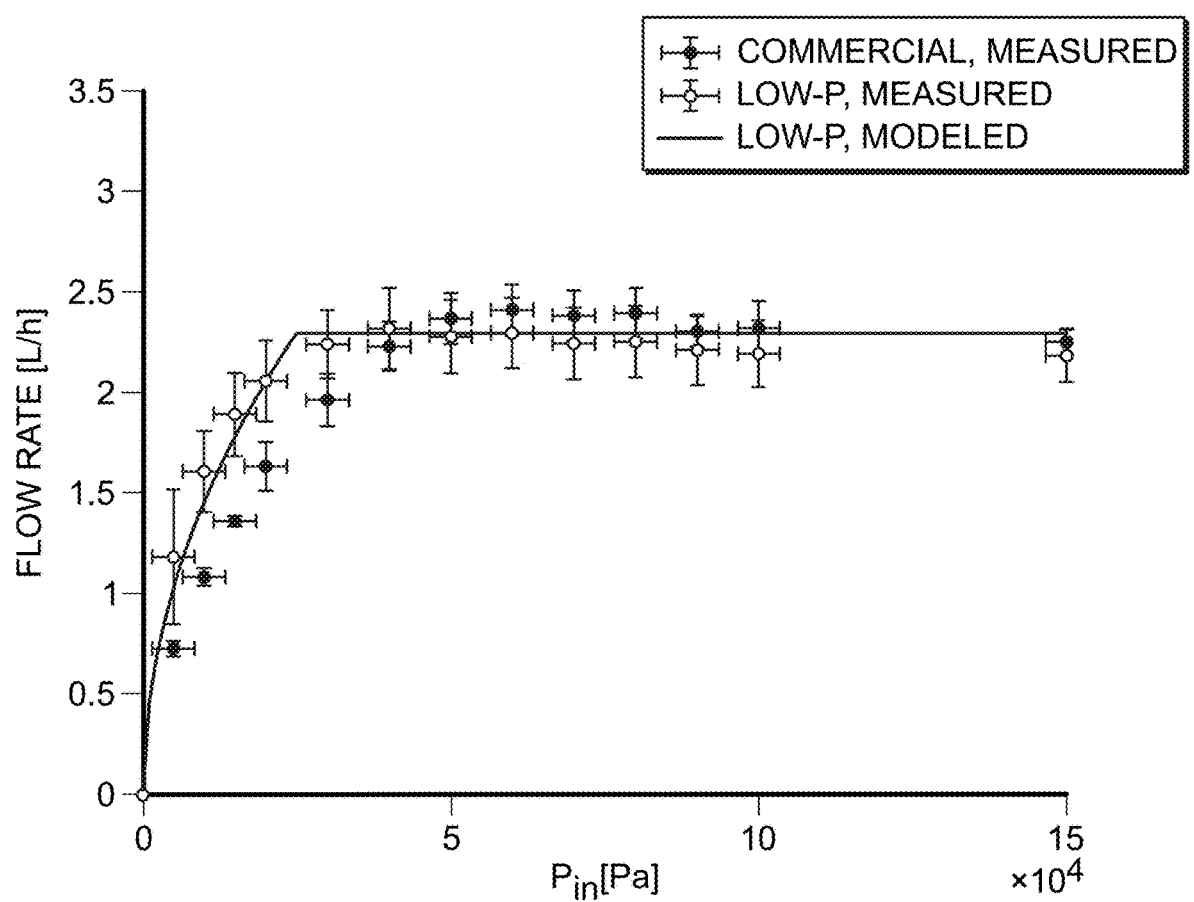
FIG. 7 is a graph comparing modeled and observed behavior for a prototype of the emitter redesigned for low activation pressure, plotted with the curve of the commercial emitter used as the basis for the redesign.

The protocols discussed above were followed to fabricate and test the full redesigned emitter with $K_{path,B}$ and $h_{lands,B}$, comparing its hydraulic performance to the modeled results and to the original commercial emitter (FIG. 7). The measured average flow rate of about 2.25±0.17 L/h matched well to the modeled flow rate of 2.3 L/h, with a relative error of about 2%. The activation pressure measured for the prototype was about 25±5 kPa (about 0.25±0.05 bar), with an error of about 9% from the modeled $P_{act,B}$=23 kPa. These errors were within expectations based on model validation results. The measured activation pressure of the redesigned emitter was about 38%±about 12% below that of the original commercial emitter with an activation pressure of about 40 kPa (about 0.4 bar) (FIG. 7).

FIG. 2 shows a comparison of modeled and observed behavior for a prototype of the emitter redesigned for low activation pressure, plotted with the curve of the commercial emitter used as the basis for the redesign (Jain Irrigation, Ltd., TurboCascade 2 L/h). The measured activation pressure of the low-pressure design is about 38%±about 12% lower than that of the basis commercial design.

The analytical model for inline PC drip emitters robustly predicts how geometric changes in the membrane, compensating chamber, and/or flow resistances affect the resulting activation pressure and flow rate. The present model is based on a common commercial architecture (FIG. 2A) but may be adapted to other geometries, including those with different membranes shapes or boundary conditions. This model can be useful as a parametric design tool for irrigation engineers, systematizing and accelerating the emitter design process instead of relying on a trial-and-error approach. The parametric nature of the model offers insights on trade-offs that can guide designers in choosing parameter values under certain design constraints-insights that are not easily codified with the empirical design processes used by irrigation companies. The modeled sensitivities can also inform the setup of the manufacturing production line by identifying which processes need to produce the tightest tolerances to obtain low performance variation.

The utility of the parametric model was demonstrated by redesigning a commercial emitter for lower activation pressure under a set of imposed constraints. The resulting prototype reduced $P_{act}$ by about 38% compared to the commercial emitter it was based on, while maintaining a similar flow rate. Such low-pressure PC emitters can be an effective tool to lower the costs of drip irrigation systems by requiring less pumping power. This can reduce the energy cost for on-grid systems, and result in substantial savings for off-grid (e.g., solar-powered) drip systems by reducing the capital cost of the solar array. Changing activation pressure from about 40 kPa (about 0.4 bar) to about 25 kPa (about 0.25 bar) is estimated to reduce off-grid system cost by about 10%. This may increase adoption of drip systems by smallholder farmers in areas where power supplies are limited or unavailable, potentially enabling improved crop production.

The presented design study is not comprehensive and was used only to show the utility of the present disclosures and the process of how an emitter could be designed within given constraints. Given greater design freedom with more than one adjustable parameter, the model can be used in an optimization algorithm with a desired objective function. For instance, an objective function for a minimum activation pressure at a target flow rate can be defined as the root mean square error (RMSE) between the modeled flow rate and the target flow rate, defined as a constant for a vector P of inlet pressures between zero and a maximum operating pressure, i.e., having an activation pressure of 0 kPa. Using a constrained nonlinear optimization solver with reasonable parameter bounds will output the optimal vector of geometric, material, and resistance inputs that minimize the objective function.

The limitations of the model must be considered when applying the disclosures presented herein to dripper design. It can be important to ensure that the assumptions of the model are satisfied within the geometric ranges under consideration. If they are not satisfied, the model can be adjusted, as needed, to incorporate different sub-models (i.e., for membrane deflection, tortuous path resistance, etc.) with additional dependencies. For example, a varying path resistance with Reynolds number or non-linearity in membrane bending could be incorporated into Equation. (1(a)) and (9), although these changes will necessitate an iterative solution for $P_{act}$ and $Q_{act}$. Another limitation of the present approach is the lack of an analytical model for hydraulic behavior after activation. This behavior can be simulated using numerical methods after conceptual design with the model described herein.

The prototyping process includes several limitations as well, with the primary one being the sensitivity of the prototype hydraulics to defects in machining. Minor defects (e.g., burrs or scratches) may result in unintended leakage between parts of the flow path that are not designed to be interconnected. To minimize these effects, care should be taken to produce prototypes with good surface finish and minimal tool marks. Finally, while the prototyping method was shown to reflect the behavior of an injection-molded dripper, it has yet to be tested in the reverse direction, by injection-molding of the prototypes geometry and bonding it into tubing to ensure that it works as anticipated.

A method for designing and prototyping inline PC emitters with desired activation pressure and flow rates using an analytical parametric model is provided. The analytical model described herein can aid emitter designers in systematically targeting desired performance. The described prototyping method can be used in conjunction with the provided model to validate and refine emitter designs. The match between the hydraulic performance of the prototypes, commercial emitters, and modeled results provides confidence that the present teachings can be used for the design of commercial products.

The model predicted activation pressure within about 15% and flow rate within about 9% of measured values for six variants of inline PC emitters. The provided for methods were successfully used to redesign a commercial emitter with about 2.2 L/h flow rate to operate at about 38% lower activation pressure than the original design. Compared to commercial inline PC emitters in that flow rate range, this lower-pressure design can lower the drip system pumping power and help reduce lifetime system costs. To achieve even further reductions in activation pressure, the present disclosures can be incorporated into an optimization routine to optimize multiple input parameters at a time, within feasible parameter bounds specified by a designer.

Figure 8:
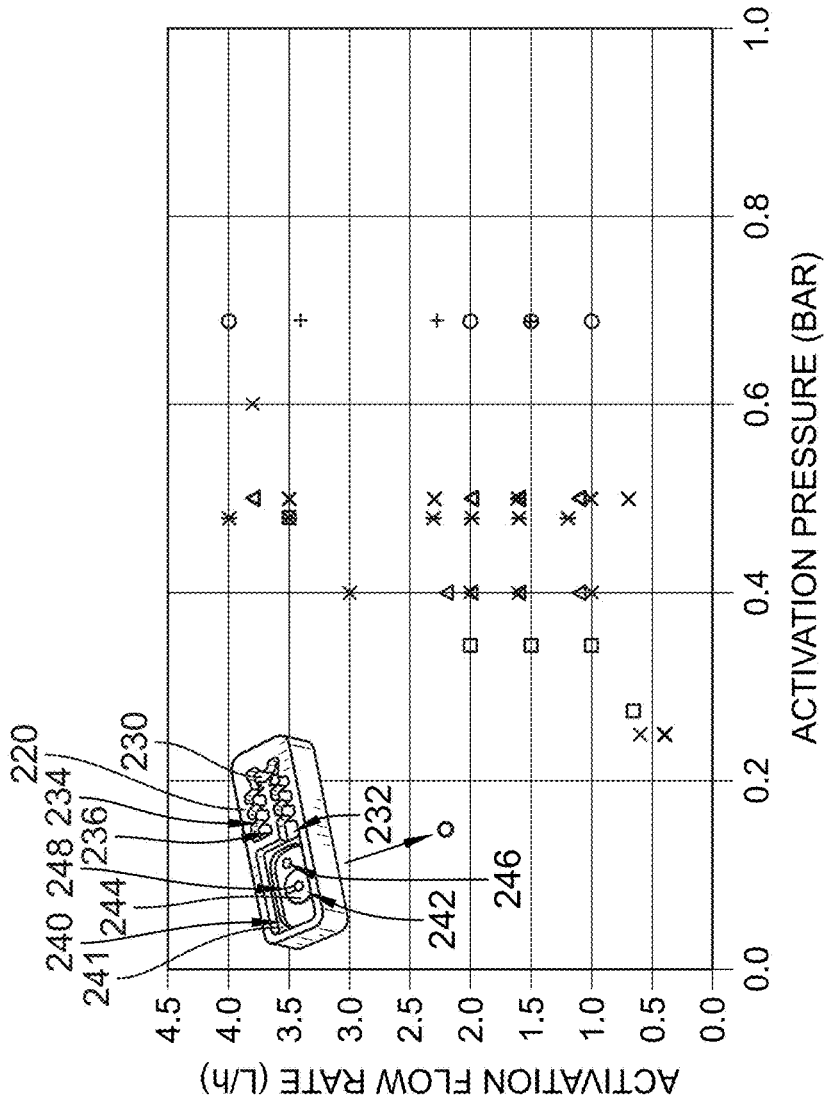
FIG. 8 is a graph that plots an activation pressure against a flow rate for various known PC drip emitter body designs, as well as one exemplary embodiment of a PC drip emitter body design in accordance with the present disclosure.

FIG. 8 illustrates one exemplary embodiment of a body 220 of a PC drip emitter that is formed in view of the systems and models disclosed herein. As shown, the body includes similar features to that of known emitters, including a flow path 230 and membrane cavity 240. The flow path 230 includes a terminal entry point 232, a terminal exit point 234, and an opening 236 in fluid communication with the membrane cavity 240, and the membrane cavity includes an outlet 242, a lands 244, an opening 246 in fluid communication with the opening 236 (by way of an unillustrated fluid path but akin to the path 38 of FIGS. 1A-1G), a channel 248, and a ledge 241 upon which a membrane (not shown, but akin to membranes 50 and 150) can be seated. Notably, the flow path 230 is significantly shorter than flow paths in known emitters, as clearly illustrated by the various figures. The design is such that the shorter path reduces resistance, and thus reduces the activation pressure. For example, a length of the flow path 230 can be approximately in the range of about 10 millimeters to about 18 millimeters. In at least one embodiment, the length of the flow path 230 is approximately 14 millimeters. In contrast, the length of the flow path for most traditional emitters can be 20 millimeters or longer, including some emitters having flow paths of 40 millimeters or longer. The flow path lengths described herein are particularly advantageous in comparison to traditional emitters in that the relatively short length of the flow path 230 is implemented while also achieving the low activation pressures described herein. Contrarily, traditional emitters, such as those having flow path lengths of 20 millimeters or greater, typically operate with higher activation pressures than the activation pressures described herein. One of ordinary skill in the art, in view of the present disclosures, will appreciate the challenges one faces in trying to achieve low activation pressures while also adjusting a flow path length; it is not merely a matter of optimization. Alternatively, or additionally, any of D, $h_{lands}$, and $K_{chamber}$ can be reduced to achieve lower activation pressure, as illustrated at least by Equation (10). Likewise, the variables that impact $K_{path}$ and/or any of D, hands, and $K_{chamber}$ can be adjusted to create lower values of $K_{path}$, D, $h_{lands}$, and/or $K_{chamber}$.

FIG. 8 also shows how the PC drip emitter that includes the body 220 and related components performed as compared to known PC drip emitters. The graph compares the metrics of activation pressure and activation flow rate, and demonstrates that the emitter that includes the body 220 had a significantly lower activation pressure than any of the other tested emitters while it still maintained a desired flow rate-comparable to and/or better than most of the tested emitters. More particularly, the PC drip emitter of the present disclosure that includes the body 220 had an activation pressure of about 0.15 bar with an activation flow rate of about 2.25 liters per hour. More generally, the values of activation pressure can be approximately in the range of about 0.1 bar to about 0.3 bar, and the values of flow rate can be approximately in the range of about 0.1 liters per hour to about 8.0 liters per hour, or more particularly approximately in the range of about 2.0 liters per hour to about 3.5 liters per hour, and even more particularly can be approximately in the range of about 2.25 liters per hour to about 3.0 liters per hour, although the flow rate can depend on a variety of factors, including but not limited to intended use, the size and shape of the components used in the irrigation system, and factors associated with the environment in which irrigation is being performed. By way of comparison, no other tester emitter had an activation pressure at 0.2 bar or lower, and the three that had activation pressures below even 0.3 bar could not achieve flow rates even close to 1 liter per hour-instead the values were closer to 0.5 liters per hour. More consistently, activation flow rates of 2.0 liters per hour or better were typically only achieved on a consistent basis when the activation pressure was 0.4 bar or greater, up to about 0.65 bar. This data clearly demonstrates both the superiority of the modeling, and the superiority of the design resulting from use of the modeling.

Figure 9:
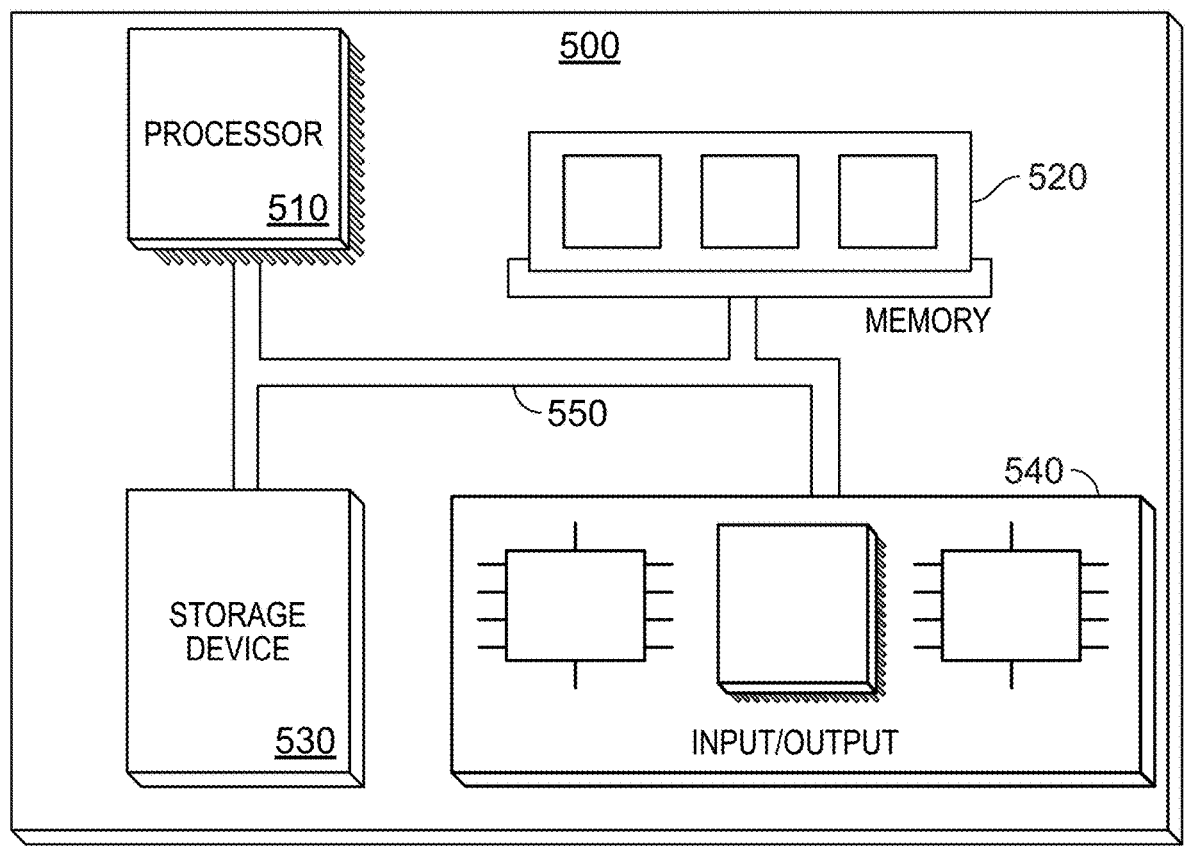
FIG. 9 is a block diagram of one exemplary embodiment of a computer system for use in conjunction with the present disclosures.

FIG. 9 is a block diagram of one exemplary embodiment of a computer system 700 upon which the present disclosures can be built, performed, trained, tested, optimized, etc. For example, the implementation of designing and/or modeling PC drip irrigation emitters in view of parameters associated with Equations (10) and (11), and/or Equations (10) and/or (11) themselves, as well as other features disclosed herein, can be performed by a system 500. The system 500 can include a processor 510, a memory 520, a storage device 530, and an input/output device 540. Each of the components 510, 520, 530, and 540 can be interconnected, for example, using a system bus 550. The processor 510 can be capable of processing instructions for execution within the system 500, such as iterating various designs based on inputs found in Equations (10) and/or (11). The processor 510 can be a single-threaded processor, a multi-threaded processor, or similar device. The processor 510 can be capable of processing instructions stored in the memory 520 or on the storage device 530. The processor 510 may execute operations such as adjusting the variables of Equations (10) and/or (11) to achieve desired activation pressures and/or flow rates, including fixing one or more of such variables while manipulating other such variables based on input provided by the system and/or a user(s). A person skilled in the art, in view of the present disclosures, will understand various ways by which the processor 510 can be programmed to design, model, test, optimize, and/or manufacture PC drip irrigation emitters.

The memory 520 can store information within the system 500. In some implementations, the memory 520 can be a computer-readable medium. The memory 520 can, for example, be a volatile memory unit or a non-volatile memory unit. In some implementations, the memory 520 can store information related to various emitter designs and variables associated with Equations 10 and/or 11, among other information.

The storage device 530 can be capable of providing mass storage for the system 500. In some implementations, the storage device 530 can be a non-transitory computer-readable medium. The storage device 530 can include, for example, a hard disk device, an optical disk device, a solid-date drive, a flash drive, magnetic tape, and/or some other large capacity storage device. The storage device 530 may alternatively be a cloud storage device, e.g., a logical storage device including multiple physical storage devices distributed on a network and accessed using a network. In some implementations, the information stored on the memory 520 can also or instead be stored on the storage device 530.

The input/output device 540 can provide input/output operations for the system 500. In some implementations, the input/output device 540 can include one or more of network interface devices (e.g., an Ethernet card), a serial communication device (e.g., an RS-23210 port), and/or a wireless interface device (e.g., a short-range wireless communication device, an 802.7 card, a 3G wireless modem, a 4G wireless modem, a 5G wireless modem). In some implementations, the input/output device 540 can include driver devices configured to receive input data and send output data to other input/output devices, e.g., a keyboard, a printer, and/or display devices. In some implementations, mobile computing devices, mobile communication devices, and other devices can be used.

In some implementations, the system 500 can be a microcontroller. A microcontroller is a device that contains multiple elements of a computer system in a single electronics package. For example, the single electronics package could contain the processor 510, the memory 520, the storage device 530, and/or input/output devices 540.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine-readable propagated signal, or a combination of one or more of them.

Various embodiments of the present disclosure may be implemented at least in part in any conventional computer programming language. For example, some embodiments may be implemented in a procedural programming language (e.g., "C"), or in an object-oriented programming language (e.g., "C++"). Other embodiments may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

Examples of the above-described embodiments can include the following:

1. A method of reducing an activation pressure in a pressure-controlled drip irrigation emitter while maintaining a substantially constant flow rate, comprising:
   adjusting at least one of the following variables that impacts an activation pressure and a flow rate of a pressure-controlled drip irrigation emitter having a body by:
      decreasing a resistance of a flow path formed in the body of the emitter;
      decreasing a resistance of a membrane cavity formed in the body of the emitter;
      decreasing a distance between a membrane disposed above a bottom surface of a membrane cavity of the body of the emitter and a top surface of a lands disposed in the membrane cavity;
      decreasing a thickness of a membrane disposed above a membrane cavity of the body of the emitter;
      increasing a length or a width of a membrane disposed above a membrane cavity of the body of the emitter; or
      decreasing a flexural modulus of a membrane disposed above a membrane cavity of the body of the emitter,
   wherein a result of the adjusting is an activation pressure approximately in the range of about 0.1 bar to about 0.3 bar.

2. The method of claim 1, wherein adjusting at least one of the following variables that impacts an activation pressure and a flow rate of a pressure-controlled drip irrigation emitter having a body comprises adjusting at least two of those variables.

3. The method of claim 2, wherein one of the variables comprises the resistance of the flow path formed in the body of the emitter.

4. The method of claim 2 or 3, wherein one of the variables comprises the distance between the membrane disposed above the bottom surface of the membrane cavity of the body of the emitter and the top surface of the lands disposed in the membrane cavity.

5. The method of any of claims 2 to 4, wherein one of the variables comprises the resistance of the membrane cavity formed in the body of the emitter.

6. The method of any of claims 2 to 5, wherein one of the variables comprises at least one of the length, the width, or the thickness of the membrane disposed above the membrane cavity of the body of the emitter.

7. The method of any of claims 2 to 6, wherein one of the variables comprises the flexural modulus of the membrane disposed above the membrane cavity of the body of the emitter.

8. The method of any of claims 1 to 7, wherein decreasing a resistance of a flow path formed in the body of the emitter further comprises decreasing a length of the flow path.

9. The method of any of claims 1 to 8, wherein decreasing a flexural modulus of a membrane disposed above a membrane cavity of the body of the emitter further comprises decreasing at least one a Young's modulus of the membrane or a Poisson's ratio of the membrane.

10. The method of any of claims 1 to 9, wherein adjusting at least one of the variables that impacts an activation pressure and a flow rate of a pressure-controlled drip irrigation emitter having a body is controlled by:

$$P_{act} = \frac{Dh_{lands}(K_{path} + K_{chamber})}{\alpha_1 K_{path} + \alpha_2 K_{chamber} \frac{\pi r_{out}^2}{ab}},$$

wherein:
P$_{act}$ is the activation pressure,
D is the flexural modulus,
h$_{lands}$ is the distance between the membrane disposed above the bottom surface of the membrane cavity of the body of the emitter and the top surface of the lands disposed in the membrane cavity,
K$_{path}$ is the resistance of the flow path formed in the body of the emitter,
K$_{chamber}$ is the resistance of the membrane cavity formed in the body of the emitter,
$\alpha_1$ is a first constant of a deflection expression of the membrane,
$\alpha_2$ is a second constant of a deflection expression of the membrane,
r is a radius of an outlet formed in the membrane cavity,
a is a length of the membrane cavity, and
b is a width of the membrane cavity.

11. The method of any of claims 1 to 10, wherein adjusting at least one of the following variables that impacts an activation pressure and a flow rate of a pressure-controlled drip $$Q_{act} = \left( \frac{Dh_{lands}}{\alpha_1 K_{path} + \alpha_2 K_{chamber} \frac{\pi r_{out}^2}{ab}} \right)^{\frac{1}{2}}$$

irrigation emitter having a body is controlled by, wherein:
Q$_{act}$ is the flow rate,
D is the flexural modulus,
h$_{lands}$ is the distance between the membrane disposed above the bottom surface of the membrane cavity of the body of the emitter and the top surface of the lands disposed in the membrane cavity,
$\alpha_1$ is a first constant of a deflection expression of the membrane,
K$_{path}$ is the resistance of the flow path formed in the body of the emitter,
$\alpha_2$ is a second constant of a deflection expression of the membrane,
K$_{chamber}$ is the resistance of the membrane cavity formed in the body of the emitter,
r is a radius of an outlet formed in the membrane cavity,
a is a length of the membrane cavity, and
b is a width of the membrane cavity.

12. A method of at least one of designing, testing, or manufacturing a pressure-controlled drip irrigation emitter, comprising at least one of:
decreasing a resistance of a flow path formed in a body of a pressure-controlled drip irrigation emitter;
decreasing a resistance of a membrane cavity formed in a body of a pressure-controlled drip irrigation emitter;
decreasing a distance between a membrane disposed above a bottom surface of a membrane cavity of a body of a pressure-controlled drip irrigation emitter and a top surface of a lands disposed in the membrane cavity;
decreasing a thickness of a membrane disposed above a membrane cavity of a body of a pressure-controlled drip irrigation emitter;
increasing at least one of a length or a width of a membrane disposed above a membrane cavity of a body of a pressure-controlled drip irrigation emitter; or
decreasing a flexural modulus of a membrane disposed above a membrane cavity of a body of a pressure-controlled drip irrigation emitter,
wherein a result of the decreasing is an activation pressure approximately in the range of about 0.1 bar to about 0.3 bar.

13. The method of claim 12, wherein at least two of the decreasing or increasing actions are performed.

14. The method of claim 13, wherein one of the decreasing or increasing actions comprises decreasing the resistance of the flow path formed in the body of the pressure-controlled drip irrigation emitter.

15. The method of claim 13 or 14, wherein one of the decreasing or increasing actions comprises decreasing the distance between the membrane disposed above the bottom surface of the membrane cavity of the body of the pressure-controlled drip irrigation emitter and the top surface of the lands disposed in the membrane cavity.

16. The method of any of claims 13 to 15, wherein one of the decreasing or increasing actions comprises decreasing the resistance of the membrane cavity formed in the body of the pressure-controlled drip irrigation emitter.

17. The method of any of claims 13 to 16, wherein one of the decreasing or increasing actions comprises decreasing the thickness of the membrane disposed above the membrane cavity of the body of the pressure-controlled drip irrigation emitter.

18. The method of any of claims 13 to 17, wherein one of the decreasing or increasing actions comprises increasing at least one of the length or the width of the membrane disposed above the membrane cavity of the body of the pressure-controlled drip irrigation emitter.

19. The method of any of claims 13 to 18, wherein one of the decreasing or increasing actions comprises decreasing the flexural modulus of the membrane disposed above the membrane cavity of the body of a pressure-controlled drip irrigation emitter.

20. The method of any of claims 12 to 19, wherein decreasing a resistance of a flow path formed in the body of the emitter further comprises decreasing a length of the flow path.

21. The method of any of claims 12 to 20, wherein decreasing a flexural modulus of a membrane disposed above a membrane cavity of the body of the emitter further comprises decreasing at least one a Young's modulus of the membrane or a Poisson's ratio of the membrane.

22. The method of any of claims 12 to 21, wherein at least one of the actions of decreasing or increasing is controlled by:

$$P_{act} = \frac{Dh_{lands}(K_{path} + K_{chamber})}{\alpha_1 K_{path} + \alpha_2 K_{chamber} \frac{\pi r_{out}^2}{ab}},$$

wherein:
$P_{act}$ is the activation pressure,
D is the flexural modulus,
$h_{lands}$ is the distance between the membrane disposed above the bottom surface of the membrane cavity of the body of the emitter and the top surface of the lands disposed in the membrane cavity,
$K_{path}$ is the resistance of the flow path formed in the body of the emitter,
$K_{chamber}$ is the resistance of the membrane cavity formed in the body of the emitter,
$\alpha_1$ is a first constant of a deflection expression of the membrane,
$\alpha_2$ is a second constant of a deflection expression of the membrane,
r is a radius of an outlet formed in the membrane cavity,
a is a length of the membrane cavity, and
b is a width of the membrane cavity.

23. The method of any of claims 12 to 22, wherein at least one of the actions of decreasing or $$Q_{act} = \left( \frac{Dh_{lands}}{\alpha_1 K_{path} + \alpha_2 K_{chamber} \frac{\pi r_{out}^2}{ab}} \right)^{\frac{1}{2}}$$

24. increasing is controlled by,
wherein:
$Q_{act}$ is the flow rate,
D is the flexural modulus,
$h_{lands}$ is the distance between the membrane disposed above the bottom surface of the membrane cavity of the body of the emitter and the top surface of the lands disposed in the membrane cavity,
$\alpha_1$ is a first constant of a deflection expression of the membrane,
$K_{path}$ is the resistance of the flow path formed in the body of the emitter,
$\alpha_2$ is a second constant of a deflection expression of the membrane,
$K_{chamber}$ is the resistance of the membrane cavity formed in the body of the emitter,
r is a radius of an outlet formed in the membrane cavity,
a is a length of the membrane cavity, and
b is a width of the membrane cavity.

25. A computer system configured to perform any of the methods of claims 1 to 23.

26. A pressure-controlled drip irrigation emitter, comprising:
an inlet;
a body;
a membrane cavity formed in the body, the membrane cavity having an opening formed therein;
an outlet in fluid communication with the membrane cavity;
a membrane disposed above a bottom surface of the membrane cavity; and
a flow path formed in the body, the flow path having an entry point that is in fluid communication with the inlet and an exit point that is in fluid communication with the opening formed in the membrane cavity, the flow path being configured to decrease a pressure of fluid flowing therethrough as it passes from the entry point to the exit point,
wherein a length of the flow path is substantially less than lengths of known flow paths, and
wherein a length of the flow path is approximately in the range of about 10 millimeters to about 18 millimeters.

27. The drip irrigation emitter of claim 25, wherein an activation pressure of the emitter is approximately in the range of about 0.1 bar to about 0.3 bar.

28. The drip irrigation emitter of claim 26, wherein the activation pressure is approximately 0.15 bar.

29. The drip irrigation emitter of any of claims 26 to 27, wherein a flow rate of the emitter once activated is approximately in the range of about 0.1 liters per hour to about 8.0 liters per hour.

30. The drip irrigation emitter of claim 28, wherein the flow rate of the emitter once activated is approximately in the range of about 2.25 liters per hour to about 3.0 liters per hour.

31. The drip irrigation emitter of any of claims 25 to 29, further comprising a cover coupled to the body, the inlet being disposed in the cover.

32. The drip irrigation emitter of any of claims 25 to 30, further comprising a lands disposed on a bottom surface of the membrane cavity.

One skilled in the art will appreciate further features and advantages of the disclosure based on the above-described embodiments. Accordingly, the disclosure is not to be limited by what has been particularly shown and described, except as indicated by the appended claims. For example, while the present embodiments often include a single feature (e.g., an inlet, an outlet, an opening, a flow path, etc.), it is possible that multiple of the same features can be incorporated into the design of an emitter without departing from the spirit of the present disclosure.

Some non-limiting claims that are supported by the contents of the present disclosure are provided below.

What is claimed is:

1. A method of reducing an activation pressure in a pressure-controlled drip irrigation emitter while maintaining a substantially constant flow rate, comprising:
adjusting at least one of the following variables that impacts an activation pressure and a flow rate of a pressure-controlled drip irrigation emitter having a body by:
decreasing a resistance of a flow path formed in the body of the pressure-controlled drip irrigation;
decreasing a resistance of a membrane cavity formed in the body of the pressure-controlled drip irrigation emitter;
decreasing a distance between the membrane disposed above the bottom surface of the membrane cavity of the body of the pressure-controlled drip irrigation emitter and the top surface of the lands disposed in the membrane cavity;
decreasing a thickness of the membrane disposed above the membrane cavity of the body of the emitter;
increasing a length or a width of the membrane disposed above the membrane cavity of the body of the emitter; or decreasing a flexural modulus of the membrane disposed above the membrane cavity of the body of the emitter, wherein a result of the adjusting is the activation pressure approximately in the range of 0.1 bar to 0.3 bar, wherein adjusting at least one of the variables that impacts the activation pressure and the flow rate of the pressure-controlled drip irrigation emitter having the body is controlled by:

$$P_{act} = \frac{Dh_{lands}(K_{path} + K_{chamber})}{\alpha_1 K_{path} + \alpha_2 K_{chamber} \frac{\pi r_{out}^2}{ab}},$$

wherein:

$P_{act}$ is the activation pressure,

D is the flexural modulus, $h_{lands}$ is the distance between the membrane disposed above the bottom surface of the membrane cavity of the body of the emitter and the top surface of the lands disposed in the membrane cavity, $K_{path}$ is the resistance of the flow path formed in the body of the emitter, $K_{chamber}$ is the resistance of the membrane cavity formed in the body of the emitter, $\alpha_1$ is a first constant of a deflection expression of the membrane, $\alpha_2$ is a second constant of a deflection expression of the membrane, r is a radius of an outlet formed in the membrane cavity, a is a length of the membrane cavity, and b is a width of the membrane cavity.

2. The method of claim 1, wherein adjusting at least one of the following variables that impacts the activation pressure and the flow rate of the pressure-controlled drip irrigation emitter having the body comprises adjusting at least two of the variables.

3. The method of claim 2, wherein one of the variables comprises the resistance of the flow path formed in the body of the pressure-controlled drip irrigation emitter.

4. The method of claim 2, wherein one of the variables comprises the distance between the membrane disposed above the bottom surface of the membrane cavity of the body of the pressure-controlled drip irrigation emitter and the top surface of the lands disposed in the membrane cavity.

5. The method of claim 2, wherein one of the variables comprises the resistance of the membrane cavity formed in the body of the pressure-controlled drip irrigation emitter.

6. The method of claim 2, wherein one of the variables comprises at least one of the length, the width, or the thickness of the membrane disposed above the membrane cavity of the body of the pressure-controlled drip irrigation emitter.

7. The method of claim 2, wherein one of the variables comprises the flexural modulus of the membrane disposed above the membrane cavity of the body of the pressure-controlled drip irrigation emitter.

8. The method of claim 1, wherein decreasing the resistance of the flow path formed in the body of the pressure-controlled drip irrigation emitter further comprises decreasing a length of the flow path.

9. The method of claim 1, wherein decreasing the flexural modulus of the membrane disposed above the membrane cavity of the body of the pressure-controlled drip irrigation emitter further comprises decreasing at least one a Young's modulus of the membrane or a Poisson's ratio of the membrane.

10. A method of at least one of designing, testing, or manufacturing a pressure-controlled drip irrigation emitter, the method comprising at least one of:

decreasing a resistance of the flow path formed in the body of the pressure-controlled drip irrigation emitter;

decreasing a resistance of the membrane cavity formed in the body of the pressure-controlled drip irrigation emitter;

decreasing a distance between a membrane disposed above a bottom surface of the membrane cavity of the body of the pressure-controlled drip irrigation emitter and a top surface of a lands disposed in the membrane cavity;

decreasing a thickness of the membrane disposed above the membrane cavity of the body of the pressure-controlled drip irrigation emitter;

increasing at least one of a length or a width of the membrane disposed above the membrane cavity of the body of the pressure-controlled drip irrigation emitter; or decreasing a flexural modulus of the membrane disposed above the membrane cavity of the body of the pressure-controlled drip irrigation emitter, wherein a result of the decreasing is an activation pressure approximately in the range of 0.1 bar to 0.3 bar, wherein at least one of the actions of decreasing or increasing is controlled by:

$$P_{act} = \frac{Dh_{lands}(K_{path} + K_{chamber})}{\alpha_1 K_{path} + \alpha_2 K_{chamber} \frac{\pi r_{out}^2}{ab}},$$

wherein:

$P_{act}$ is the activation pressure,

D is the flexural modulus, $h_{lands}$ is the distance between the membrane disposed above the bottom surface of the membrane cavity of the body of the emitter and the top surface of the lands disposed in the membrane cavity, $K_{path}$ is the resistance of the flow path formed in the body of the emitter, $K_{chamber}$ is the resistance of the membrane cavity formed in the body of the emitter, $\alpha_1$ is a first constant of a deflection expression of the membrane, $\alpha_2$ is a second constant of a deflection expression of the membrane, r is a radius of an outlet formed in the membrane cavity, a is a length of the membrane cavity, and b is a width of the membrane cavity.

11. The method of claim 10, wherein at least two of the decreasing or increasing actions are performed.

12. The method of claim 11, wherein one of the decreasing or increasing actions comprises one of decreasing the resistance of the flow path formed in the body of the pressure-controlled drip irrigation emitter and decreasing the resistance of the membrane cavity formed in the body of the pressure-controlled drip irrigation emitter.

13. The method of claim 11, wherein one of the decreasing or increasing actions comprises one of decreasing the distance between the membrane disposed above the bottom surface of the membrane cavity of the body of the pressure-controlled drip irrigation emitter and the top surface of the lands disposed in the membrane cavity or decreasing the thickness of the membrane disposed above the membrane cavity of the body of the pressure-controlled drip irrigation emitter.

14. The method of claim 10, wherein decreasing the resistance of the flow path formed in the body of the pressure-controlled drip irrigation emitter further comprises decreasing a length of the flow path.

15. A pressure-controlled drip irrigation emitter, comprising:
an inlet;
a body;
a membrane cavity formed in the body, the membrane cavity having an opening formed therein;
an outlet in fluid communication with the membrane cavity;
a membrane disposed above a bottom surface of the membrane cavity; and
a flow path formed in the body, the flow path having an entry point that is in fluid communication with the inlet and an exit point that is in fluid communication with the opening formed in the membrane cavity, the flow path being configured to decrease a pressure of fluid flowing therethrough as it passes from the entry point to the exit point,
wherein the pressure-controlled drip irrigation emitter is formed by adjusting at least one of the following variables that impacts an activation pressure and a flow rate of the pressure-controlled drip irrigation emitter by:
decreasing a resistance of the flow path formed in the body of the pressure-controlled drip irrigation emitter;
decreasing a resistance of the membrane cavity formed in the body of the pressure-controlled drip irrigation emitter;
decreasing a distance between the membrane disposed above the bottom surface of the membrane cavity of the body of the pressure-controlled drip irrigation emitter and the top surface of the lands disposed in the membrane cavity
decreasing a thickness of the membrane disposed above the membrane cavity of the body of the emitter;
increasing a length or a width of the membrane disposed above the membrane cavity of the body of the emitter; or
decreasing a flexural modulus of the membrane disposed above the membrane cavity of the body of the emitter,
wherein a result of the adjusting is the activation pressure approximately in the range of 0.1 bar to 0.3 bar,
wherein adjusting at least one of the variables that impacts the activation pressure and the flow rate of the pressure-controlled drip irrigation emitter having the body is controlled by:

$$P_{act} = \frac{Dh_{lands}(K_{path} + K_{chamber})}{\alpha_1 K_{path} + \alpha_2 K_{chamber} \frac{\pi r_{out}^2}{ab}},$$

wherein:
$P_{act}$ is the activation pressure,
D is the flexural modulus,
$h_{lands}$ is the distance between the membrane disposed above the bottom surface of the membrane cavity of the body of the emitter and the top surface of the lands disposed in the membrane cavity,
$K_{path}$ is the resistance of the flow path formed in the body of the emitter,
$K_{chamber}$ is the resistance of the membrane cavity formed in the body of the emitter,
$\alpha_1$ is a first constant of a deflection expression of the membrane,
$\alpha_2$ is a second constant of a deflection expression of the membrane,
r is a radius of an outlet formed in the membrane cavity,
a is a length of the membrane cavity, and
b is a width of the membrane cavity.

16. The drip irrigation emitter of claim 15, wherein an activation pressure of the emitter is approximately in the range of 0.1 bar to 0.3 bar,
wherein a length of the flow path is substantially less than lengths of known flow paths, and
wherein a length of the flow path is approximately in the range of 10 millimeters to 18 millimeters.

17. The drip irrigation emitter of claim 15, wherein decreasing the resistance of the flow path formed in the body of the pressure-controlled drip irrigation emitter further comprises decreasing a length of the flow path.

18. The drip irrigation emitter of claim 15, wherein decreasing the flexural modulus of the membrane disposed above the membrane cavity of the body of the pressure-controlled drip irrigation emitter further comprises decreasing at least one a Young's modulus of the membrane or a Poisson's ratio of the membrane.

* * * * *